United States Patent
Zakrzewski

(10) Patent No.: US 9,433,021 B2
(45) Date of Patent: Aug. 30, 2016

(54) PAGING OFFLINE STATE TERMINALS

(71) Applicant: SCA IPLA HOLDINGS INC, New York, NY (US)

(72) Inventor: Robert Zakrzewski, Bristol (GB)

(73) Assignee: SCA IPLA HOLDINGS INC, New York, NY (US)

( * ) Notice: Subject to any disclaimer, the term of this patent is extended or adjusted under 35 U.S.C. 154(b) by 73 days.

(21) Appl. No.: 14/358,615

(22) PCT Filed: Nov. 8, 2012

(86) PCT No.: PCT/GB2012/052777
§ 371 (c)(1),
(2) Date: May 15, 2014

(87) PCT Pub. No.: WO2013/076455
PCT Pub. Date: May 30, 2013

(65) Prior Publication Data
US 2014/0321412 A1  Oct. 30, 2014

(30) Foreign Application Priority Data

Nov. 22, 2011 (GB) .................................. 1120151.4
Nov. 22, 2011 (GB) .................................. 1120152.2

(51) Int. Cl.
*H04W 76/02* (2009.01)
*H04W 8/22* (2009.01)
(Continued)

(52) U.S. Cl.
CPC ............ *H04W 76/02* (2013.01); *H04W 4/005* (2013.01); *H04W 4/02* (2013.01); *H04W 8/22* (2013.01); *H04W 68/02* (2013.01); *H04W 60/00* (2013.01)

(58) Field of Classification Search
None
See application file for complete search history.

(56) References Cited

U.S. PATENT DOCUMENTS

2008/0151914 A1  6/2008  Cho et al.
2011/0122859 A1  5/2011  Song et al.
(Continued)

FOREIGN PATENT DOCUMENTS

GB   2476415       6/2011
WO   2007 024102   3/2007
(Continued)

OTHER PUBLICATIONS

ETSI TS 122 368 V10.5.0, Digital cellular telecommunications system (Phase 2+); Universal Mobile Telecommunications System (UMTS); LTE; Service requirements for Machine-Type Communications (MTC); Stage 1 (3GPP TS 22.368 version 10.5.0 Release 10), Total 18 Pages, (Jul. 2011).
(Continued)

*Primary Examiner* — Charles C Jiang
*Assistant Examiner* — George Atkins, Jr.
(74) *Attorney, Agent, or Firm* — Oblon, McClelland, Maier & Neustadt, L.L.P.

(57) ABSTRACT

A mobile communications system includes a mobile communications network configured to transmit/receive data to/from communications terminals. The mobile communications network includes a virtual mobility manager configured to store at least part of context information of a communications terminal when the communications terminal enters an off-line state so that if a triggering event occurs when the communications terminal is in the off-line state, the virtual mobility manager can page the off-line communications terminal in the off-line state so that a communications bearer can be established with the communications terminal using the stored context information, for communicating the data after the communications terminal has moved to an attached state.

35 Claims, 14 Drawing Sheets

(51) Int. Cl.
*H04W 4/02* (2009.01)
*H04W 68/02* (2009.01)
*H04W 4/00* (2009.01)
*H04W 60/00* (2009.01)

(56) References Cited

U.S. PATENT DOCUMENTS

| | | | | |
|---|---|---|---|---|
| 2012/0184205 A1* | 7/2012 | Luft | ............... | H04W 52/02 455/9 |
| 2013/0115893 A1* | 5/2013 | Hietalahti | ............ | H04W 48/02 455/68 |
| 2013/0136032 A1* | 5/2013 | Meirosu | ............... | H04W 8/02 370/254 |

FOREIGN PATENT DOCUMENTS

| | | | | |
|---|---|---|---|---|
| WO | 2010 006206 | | 1/2010 | |
| WO | WO 2011/119680 A2 | | 9/2011 | |
| WO | WO/2011/144224 | * | 11/2011 | ............. H04W 8/26 |

OTHER PUBLICATIONS

3GPP TSG SA WG2 Meeting #85, TD S2-112330, "Device Triggering for offline MTC device", ZTE, vol. SA WG2, No. Xi'An, pp. 1-3, (May 11, 2011) XP050525351.
3GPP TSG SA WG2 Meeting #84, TD S2-111698, "Offline Triggering Working Assumptions", Alcatel-Lucent, vol. SA WG2, No. Bratislava, pp. 1-4, (Apr. 6, 2011) XP050524606.
SA WG2 Meeting #85, S2-112500, Scheduling of Offline Device Triggering, Panasonic, vol. SA WG2, No. Xi'An, pp. 1-3, (May 11, 2011) XP050525076.
International Search Report Issued Apr. 17, 2013 in PCT/GB12/052777 Filed Nov. 8, 2012.
Great Britain Search Report Issued Mar. 22, 2012 in Great Britain Application No. 1120152.2 Filed Nov. 22, 2011.
U.S. Appl. No. 14/357,064, filed May 8, 2014, Zakrzewski.
Japanese Office Action issued May 31, 2016 in corresponding Japanese Application No. 2014-542926 (3 pages).
Network Improvements for MTC Monitoring, 3GPP TSG SA 2G2 Meeting #78, Feb. 22-26, 2010, Revision of S2-101075 (1 page).

* cited by examiner

PAGING OFFLINE STATE TERMINALS

CROSS-REFERENCE TO RELATED APPLICATIONS

The present application claims priority to British Patent Application 1120151.4, filed in the UK IPO on 22 Nov. 2011 and British Patent Application 1120152.2, filed in the UK IPO on 22 Nov. 2011, the entire contents of each of which being incorporated herein by reference.

FIELD OF THE INVENTION

The present invention relates to mobile communications systems for communicating data to and/or from communications terminals, mobile communications networks, infrastructure equipment, base stations and methods for communicating data.

Embodiments of the present invention provide a technique for managing communications terminals in an offline state to facilitate procedures initiate by either a mobile communications network or the mobile communications terminals to enable data transfers on either the uplink or the down link.

BACKGROUND

Wireless mobile telecommunication systems such as the 3GPP defined UMTS and LTE systems have been designed to provide high data rate mobile communication services to users of communication terminals. Conventionally an LTE network would be expected to provide communication services to communication terminals such as smartphones and personal computers (e.g. laptops, tablets and so on). These types of communication services are typically provided with high performance dedicated data connections optimized for high bandwidth applications such as streaming video data. However, recent developments in the field of machine type communication (MTC) (sometimes referred to as machine to machine (M2M) communication) have resulted in more diverse applications being developed to take advantage of the increasing ubiquity of mobile telecommunication networks. As such it is increasingly likely that an LTE network will also be expected to support communication services for devices such as smart meters and smart sensors. Devices such as these, generally classified as "MTC devices", are typically less complex than conventional LTE communication terminals such as smartphones and personal computers and are characterised by the transmission and reception of relatively low quantities of data at relatively infrequent intervals.

However, certain aspects of LTE type systems are not optimized for the operation of MTC devices. For example, generally LTE communication terminals exist in one of two logical states: attached or detached. In the detached state, the communication terminal is typically either powered off or de-registered if out of range of the network for a long time. In the attached state the location of the communication terminal is monitored by the network and the device also remains powered up ready to receive paging messages from the network.

This can be inefficient for MTC devices, particularly if they are deployed in large numbers. Firstly a large quantity of network resource would be required to support a high number of devices and secondly, in order for an MTC device to stay in the registered state, it is required to keep its transceiver circuitry powered up to monitor the paging channels. In low complexity devices which may not have access to an external power supply, this power consumption may be undesirable.

Accordingly, efforts have been made to define a new "offline" state specifically for MTC type devices. In the offline state it is intended that MTC devices can still be paged but the amount of network resource that is required to support the offline state is reduced along with the amount of power consumed by the MTC device when in the offline state. However, so far, conventional LTE network architecture does not support the offline state.

SUMMARY OF THE INVENTION

In accordance with a first aspect of the present invention, there is provided a mobile communications system comprising one or more mobile communications terminals operating with a mobile communications network. The mobile communications network comprises a radio network part including a plurality of base stations arranged to transmit data to and receive data from the one or more communications terminals via a radio access interface, and a core network part. The core network part includes at least one packet data network gateway which is arranged to route the data to and receive the data from the base stations of the radio network part via the core network and a mobility manager arranged to track a location of the communications terminals within the mobile communications network for routing the data to or receiving the data from the communications terminals via the radio network part in accordance with context information which is stored for each of the one or more communications terminals. The mobile communications network includes a virtual mobility manager which is configured to store at least part of the context information of a communications terminal when the communications terminal enters an offline state so that if a triggering event occurs when the communications terminal is in the offline state, the virtual mobility manager can page the offline communications terminal in the offline state so that a communications bearer can be established with the communications terminal, using the stored context information, for communicating the data after the communications terminal has moved to an attached state. The offline state may for example correspond to a state in which the communications terminal reduces an amount of data communicated to or received from the mobile communications network.

Embodiments of the present invention can provide an improved technique for implementing an offline state for communications terminals operating with a mobile communication network. In particular, an improvement is provided when the communications terminal enters the offline state, because the location of each terminal is not tracked in the sense that the communications terminal is not required to inform the network when changing designated tracking areas or a set of tracking areas and so paging can be co-ordinated by a higher level virtual mobility manager rather than a lower level mobility manager. As a result, a load on the mobility manager can be reduced. This reduces a likelihood of the mobility manager being overburdened with tracking the location of a large number of communications terminals in the offline state and enables it instead to remain dedicated to communications terminals in the conventional attached state.

The virtual mobility manager may be arranged to store a unique identity of the offline communications terminal and following a trigger event, the virtual mobility manager is arranged to send a paging command to the radio access part including the identity of the offline communications terminal, and the base stations are arranged to transmit a paging message including the identity of the offline communications terminal.

In conventional mobile telecommunication systems it is considered undesirable to implement a "global" paging scheme whereby an entire network is paged when downlink data is received by the network for communication to terminals when the location of the terminal is unknown. Usually, should such a scheme be implemented in a large network, the downlink channel of each cell could quickly become overloaded with paging messages. Thus, in many conventional mobile telecommunication systems such as those based on the LTE network architecture, the location of each communications terminal in the connected state (or equivalent) is monitored by the network at least to the resolution of the tracking area or a set of tracking areas contained in a tracking area list. This enables paging messages to be routed to a part of the network corresponding to a tracking area where a communications terminal is located without having to transmit paging messages in every cell. In contrast with conventional mobile telecommunication systems, in accordance with embodiments of the present invention it has been recognised that an identity associated with communications terminals in the offline state can advantageously be stored at a virtual mobility manager thereby facilitating a global paging scheme using for example the packet data network (PDN) gateway. The offline state has been proposed in view of certain types of terminals, for example MTC type devices, although not exclusively, which typically transmit and receive only small quantities of data. Therefore the frequency with which paging messages are sent to certain types of terminals is likely to be comparatively low compared to other types of terminals. Furthermore, network operators may choose to restrict the transmission of data to these types of communications terminals to times at which the network is less busy with conventional data traffic. Consequently, implementing a global paging scheme for some type of terminals would not necessarily increase the load on the downlink channels beyond tolerable levels. Moreover, using a global paging scheme to support the offline state provides certain advantages, not least removing the requirement that the locations of communications terminals in the offline state are tracked.

In some examples, the mobility manager may be configured to detect that the communications terminal has entered the offline state, and upon detecting that the communications terminal has entered the offline state, to transmit the at least part of the context information of the offline communications terminal with the unique identity associated with offline communication terminal to the virtual mobility manager. The virtual mobility manager may be configured to store the at least part of the context information communicated from the mobility manager in association with the unique identifier for the offline communications terminal.

In some examples, the virtual mobility manager may be configured, after receiving the at least part of the context information from the mobility manager to generate a second unique identifier, to communicate the second unique identifier to the offline communications terminal, and to store the at least part of the context information with the second unique identifier. For example, the first unique identifier and the second unique identifier are global unique identifiers (GUTI), and the second unique identifier may be based on the first unique identifier.

In some examples the triggering event which causes to virtual mobility manager to arrange for the mobile communications terminal to be paged may include for example at least one of the packet data network gateway receiving data for communicating to the offline communications terminal, the mobile communications network receiving control plane data for communicating to the offline communications terminal, the offline communications terminal moving from the offline state to the attached state in response to a user command or the offline communications terminal moving from the offline state to the attached state in order to communicate data to the mobile communications network.

In some example embodiments global paging of the whole mobile communications network or a plurality of networks may not be implemented for the whole network or networks contemporaneously, if a communications terminal being paged is known to be receiving or transmitting delay tolerant data. For example, for MTC devices global paging at the same time may not be required as such devices usually handle delay tolerant traffic.

According to some examples the mobile communications network is arranged to implement a hierarchical paging scheme in which the PLMN area is divided into regions. A first of the regions to which the communications terminal was last attached is paged first because it is most likely that the communications terminal has not roamed from this tracking area. However if the communications terminal is not successfully paged with this first tracking area, because no acknowledgement is received from the communications terminal, then other regions are selected to be paged. This selection may be done in different ways, for example geographical proximities e.g. in circles covering larger regions but excluding the region which has been paged, or in squares (but this is with the granularity of the tracking area), or based on current load of the paging channel in some designated regions.) This can be a substantial benefit in certain types of networks, particularly those which contain a high number of terminals that are likely to be in the offline state.

As explained above, in accordance with examples of the present invention, the virtual mobility manager that manages paging for terminals in the offline state is in one example not a network element with mobility tracking functionality, for example an LTE mobility management entity i.e. the MME or in the 2G/3G system for data services the SGSN, but is a higher level network gateway which does not track the specific location of each terminal within the network and instead simply monitors which terminals are in the offline state. In one example the virtual mobility manager is associated with a PDN-GW, in the sense that it is anchored to the functionality of the PDN-GW. Anchoring this paging functionality at the network gateway enables the mobility management entity to devote more resource to managing the paging of terminals in the conventional attached state because, for example, communications terminals in the offline state no longer need to be tracked. Other advantages include obviating or reducing a requirement to establish bearers via the NAS signalling as the network is capable of restoring communications bearers, when the transition from the Offline to Registered state occurs, and the communications terminal retains bearer information in the offline state whereas in the de-registered state this bearer information is lost there could be one or more bearers established. This is also applicable to the UMTS/2G as the PDN context may be still established when the communications terminal is moved to the offline state. Moreover, the number of terminals that can be supported in the offline state is limited only by the capacity of the network gateway interface to maintain a record of which terminals are currently in the offline state.

In some embodiments the virtual mobility manager may be co-located with a packet data network gateway of the telecommunications network PDN-GW. The virtual mobility manager is a separate logical entity from the network gateway. As will be appreciated the mobility manager and a serving gateway may or may not be co-located depending on the design. However they are two separate logical entities.

Various further aspects and features of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Conventional LTE Network

Figure 1:
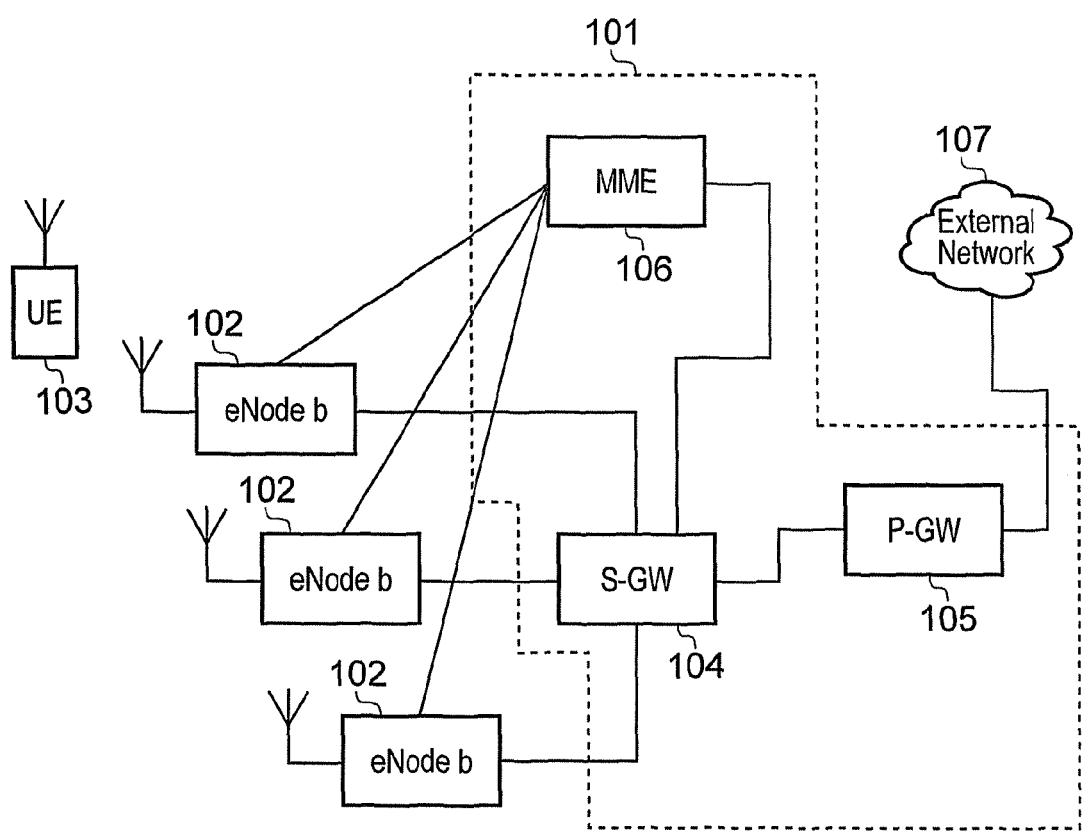
FIG. 1 provides a schematic diagram showing an example of a conventional mobile telecommunication system based on the 3GPP defined Long Term Evolution (LTE) system architecture.

FIG. 1 provides a schematic diagram of a conventional mobile telecommunications network arranged in accordance with the Long Term Evolution (LTE) 3GPP architecture standards. The LTE network includes a core network part 101 connected to a plurality of base stations 102 referred to in the art as an enhanced Node Bs (eNode B). The eNode Bs 102 are arranged to transmit data to and receive data from one or more terminals 103 via a radio interface. The terminals 103 are generally referred to as "communications terminals" which can include devices such as mobile phones, smart phones, data cards and so on.

The LTE core network 101 includes a serving gateway (S-GW) 104 which is arranged to route data to and from the eNode B 102. The serving gateway 104 is connected to a packet data network gateway (PDN-GW) 105 which routes data into and out of the LTE core network from an external network 107. The LTE core network 101 also includes a mobility management entity (MME) 106 connected to the serving gateway 104 which is responsible for authenticating communications terminals 103 attempting to access the LTE network by retrieving subscriber profile and authentication information stored in a home subscriber server (HSS) (not shown). Typically the MME 106 is also connected to the eNode Bs 102. Although not shown in FIG. 1, as is known in the art, usually an LTE based mobile telecommunications network will include more than one S-GW and more than one MME. Moreover, the network will typically comprise many hundreds if not thousands of eNode Bs. The eNode Bs can be grouped together to form tracking area(s) which are served by a specific MME and S-GW(s).

As is known in the art, a conventional LTE mobile telecommunication network comprises further network elements such as a Policy and Charging Related Function (PCRF) and Policy and Charging Enforcement Function (PCEF) which amongst other entities they constitute the Policy Control and Charging (PCC) subsystem; however for the sake of brevity these have been omitted.

Conventional Communications Terminal States

A communications terminal is usually in one of three states: detached, idle or connected. An LTE communications terminal typically is initially in the detached state, then transitions to the connected state and then transitions between the connected state and the idle state. This process is explained in more detail below. In the detached state, the communications terminal 103 is usually switched off or in the so called "flight-safe mode" state or in the process of attempting to attach to the network or out of range of the network coverage area for a long time which will result in the network performing an implicit detach. In any case, the location of the communications terminal is unknown to the network and it cannot be paged. In the idle state, the communications terminal 103 has been authenticated and has attached to the network but is not transmitting or receiving any data packets. When in the idle state, the tracking area(s) which indicate a current location of the communications terminal 103 is stored in the MME 106. Thus when in the idle state the communications terminal 103 is required to notify its current location by initiating C-Plane signalling. The trigger is when the communications terminal has changed the tracking area or currently assigned set of tracking areas. Whilst no further information about the communications terminal 103 is stored at the eNB, there is a communications terminal context stored at the S-GW.

When in the connected state, the coverage area/cell in which the communications terminal 103 is located is known by the MME so that data packets can be routed via the S-GW 104 and the eNB 102 to and from the communications terminal 103. The communications terminal 103 also has a radio resource connection with the eNode B 101 so that dedicated uplink and downlink radio resources can be specifically assigned to the communications terminal. In both the idle and the connected states, the location of the communications terminal is known (although not necessarily within a specific cell) and the communications terminal can be paged by the network when it is in the IDLE state (Note:

in UMTS it is possible to send the paging message in the "connected" state in some scenarios).

In 23.368 further explanations were given to the meaning of "offline/online" terminals which is quoted below:
  Online: "Online" means the MTC Device is attached to the network for Mobile Terminated (MT) signalling or user plane data.
  Offline: When the MTC Device is "offline" (i.e. detached) the MTC Device can listen to trigger indications on for example a broadcast or paging channel.

There are a few service requirements in 22.368 which assume the system is able to manage terminals which are in the "offline" state. They are as follows:
  Common service requirement: MTC devices may be kept offline or online when not communicating, depending on operators policies and MTC application requirements
  Device Triggering: Receiving trigger indication when the MTC device is offline
  Location Trigger: The network shall be able to initiate a trigger to the MTC device based on the area information provided by the network operator and the network may apply location specific triggers when the MTC device is offline (it is assumed that the area covered is based on the characteristics of the radio access network e.g. a cell or a group of cells)
  Infrequent transmission:
    The network shall establish resources only when transmission occurs
    When there is data to transmit/receive, the MTC device shall connect to the network, transmit and/or receive the data then return to an offline state Network Implementation for Offline State As will be explained in the following passages, example embodiments of the present invention can provide a technique for addressing a technical problem of notifying communications terminals in the offline state to establish a bearer for communicating data to the communications terminals.

Conventionally, if downlink data addressed to a communications terminal in the idle state is received at the PDN-GW 105, the PDN-GW forwards the data to the S-GW which notifies the MME about the pending downlink data for the delivery to the communications terminal then a paging command is generated by the MME 106 and sent to all relevant eNode Bs 102 in the relevant tracking area. The eNode 102 then transmit a paging message. Upon detection of the paging message, the paged communications terminal 103 transitions to the connected state and the MME establishes the necessary U-Plane connections with the communications terminal 103, eNB 102 and the S-GW 104 to receive the downlink data. However the trigger for establishing the U-plane data path comes from the communications terminal when it responds to the paging message. As will be explained further below, in accordance with examples of the present technique, the GUTI allocated to a communications terminal is adapted for the purpose of communications terminal identification during paging and for the purpose of routing of the control plane signalling to appropriate nodes in the network.

Figure 2:
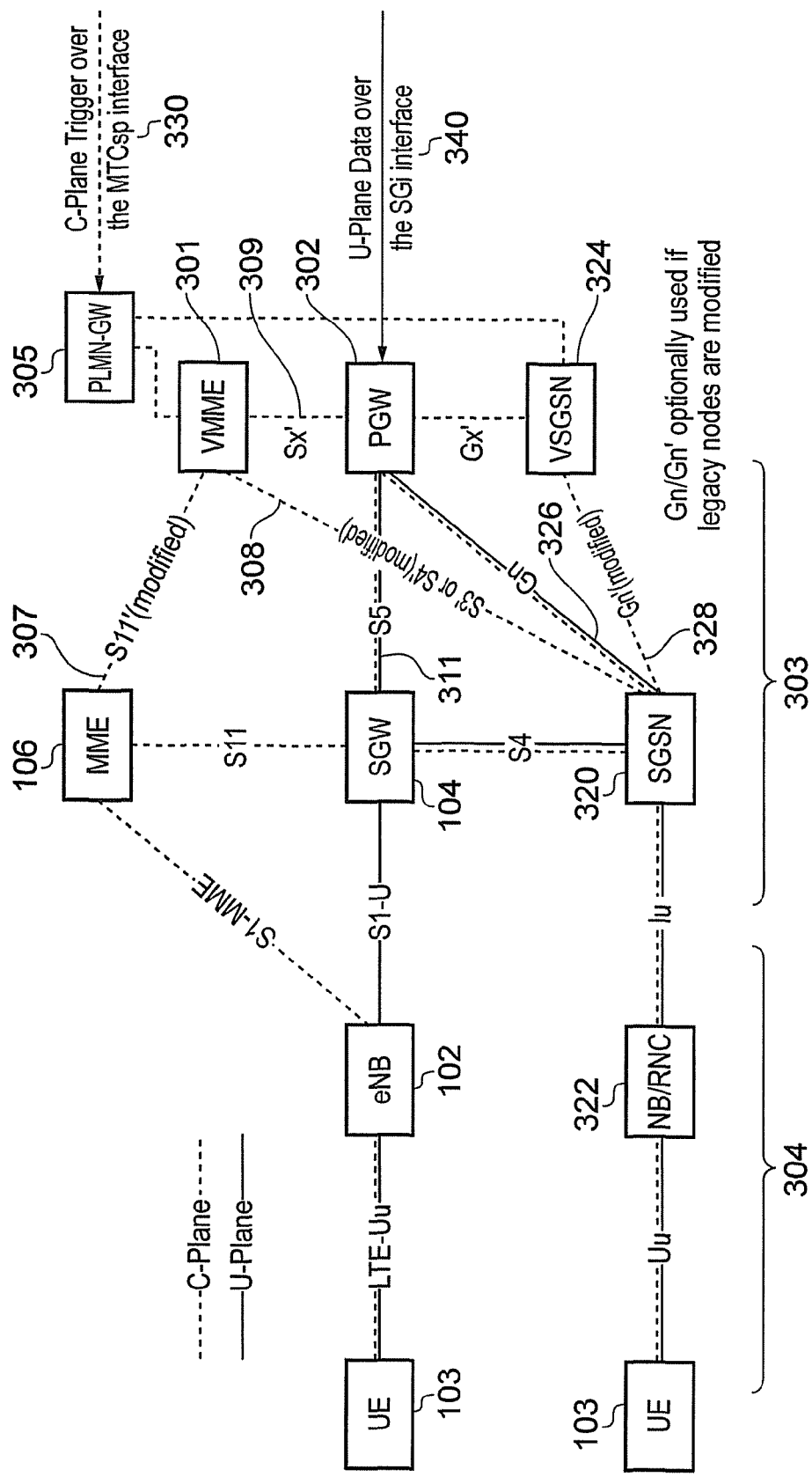
FIG. 2 provides a schematic diagram showing an example of a mobile telecommunications system arranged in accordance with an example of the present technique.

FIG. 2 provides a schematic diagram showing a telecommunication network arranged in accordance with an example of the present technique.

The telecommunication network shown in FIG. 2 includes elements corresponding to those present in the conventional telecommunication system shown in FIG. 1. These elements are numbered in correspondence with those shown in FIG. 1. However, the network shown in FIG. 2 includes an adapted core network 303, which operates with a radio network part 304 to communicate data to and from the communications terminals 103. In FIG. 2, control or C-plane interfaces are shown with dashed lines, whereas user or U-plane interfaces are shown with solid lines.

As shown in FIG. 2, the core network part of the telecommunications system includes a Virtual Mobility Management Entity (VMME) 301 coupled to a Packet Data Network Gateway PDN-GW 302. For clarity the functions of the VMME 301 and the PDN-GW 302 will be described separately. However, it will be understood that in some examples the VMME 301 and the PDN-GW 302 can be implemented as a single logical entity.

The radio network part of the communications shown in FIG. 2 provides a heterogeneous wireless access network in that the radio network part 304 also includes infrastructure components from a 2G/GPRS network such as a Serving Gateway Support Node (SGSN) 320 an a radio network controller (RNC) and base station (NodeB) 322 as well as infrastructure components which form a wireless access interface according to the LTE standard explained above with reference to FIG. 1. In addition a Virtual Serving Gateway Support Node (VSGSN) forms part of the core network 303 for communicating data to and from the SGSN 320. As shown in FIG. 2, the PDN-GW 302 is connected to the SGSN 320 a Gn interface 326, the VSGSN 324 is connected to SGSN 320 via a Gn' interface 328 and the VMME 301 is connected to the SGSN 320 via a modified S3' or S4' interface 308. The interface 328 and the SGSN 320 may be modified to allow legacy infrastructure equipment according to for example a 2G/GPRS standard to operate with the VSGSN 324 which functionally is similar to the VMME 301. This is explained below.

As shown in FIG. 2, the VMME 301 includes an S11' interface 307 which connects it with the MME 106 or a connection to the MME 106 may be achieved more conventionally via the S-GW 104 via an S-11 interface 309 and an S5 interface 311. The PDN-GW 302 is also provided with a Gx' interface for communicating with the VSGSN 324 and/or an Sx' interface for connecting to the VMME 301. In some examples the Sx' may not be required, for example if there is a one to one mapping between the PDN-GW 301 and the VMME 301 and the PDN-GW 301 and the VMME 301 are co-located.

The network of FIG. 2 also includes a PLMN Gateway (PLMN-GW) 305, which is connected to an external network and may receive control plane (C-plane) triggers identifying that there is a requirement to communicate signalling data to a communications terminal 103. The functions of the VMME 301, the PDN-GW 302 and the PLMN-GW 305 are explained below with reference to the implementation of the offline state.

Offline State

Conventionally, a communications terminal is in either the connected or idle state (collectively referred to as the attached state) or in the detached state. In the attached and idle states the communications terminal can be paged and information regarding the location of the communications terminal is stored in the MME of the network. At the very least the tracking area or a set of tracking areas within which the communications terminal is known. On the other hand the detached state, the communications terminal is, effectively, completely disconnected from the network in that its location is not tracked and it cannot be paged, nor can the ingress IP flow be associated with the communications terminal, so routing of data is not possible.

In accordance with the present technique, conventional network functionality is adapted to support a further offline state. In the offline state, in contrast with the conventional idle and connected states, the location of the communications terminal is not tracked within the network but the communications terminal and the network is arranged so that the communications terminal can still be paged. The network is also able to establish means to route data. As will be explained below, in order to facilitate this arrangement, when a communications terminal moves to the offline state and its location is no longer tracked by the network, the VMME 301 stores the communications terminal's EPS MM context with the old GUTI, a new GUTI is allocated and is used in signalling initiated by the communications terminal and the network. For example a modified location update procedure is used to report periodically a communications terminal's presence to the PLMN as well as paging.

When a communications terminal is required to enter the offline state, the network (MME) requests the VMME to establish the communication terminal's EPS MM context and then it sends an offline state update message to the communications terminal 103 informing the communications terminal 103 that it shall be entering the offline state.

As described above, the MME 106 allocates a GUTI for every communications terminal active in the network which is controlled by this MME. When the MME 106 takes the decision to move the UE 103 to the offline state or it is requested to do so by the network, it sends a communications terminal offline notification message to the VMME 301. This message includes the communications terminal's EPS MM context information with the GUTI of the communications terminal. In some examples, the MME 106 then deletes or caches the EPS MM context information associated with the communications terminal along with all other information associated with the communications terminal when it was attached.

When the VMME 301 receives the state update message, the GUTI of the communications terminal entering the offline state is discarded by the VMME, and the VMME creates a new GUTI for the communications terminal. However the new GUTI includes the mobile country code (MCC) and mobile network code (MNC) of the communications terminal. The new GUTI is then communicated to the communications terminal by the VMME 301 via the MME 106.

The IP address associated with the communications terminal which is moved to offline state is kept and stored at the PDN-GW as part of the context information for the communications terminal. For communications terminals entering the offline state the context information maintained is a sub-set of the context information in the online state because some of the fields are not relevant.

Typically this is performed by the VMME 301. The PDN-GW 302 maintains records with the context information of all registered communications terminals and also information relating to the offline state. The context information besides other information has the IP address associated with the communications terminal and a new indication whether the communications terminal is in the offline or registered state.

As will be appreciated the IP address may also be allocated by the external network, in which case conventionally the PDN-GW stores the IP address. However a tunnel is established between the ISP (Internet Service Provider) and the PDN-GW. This tunnel is not removed when the communications terminal is moved to the offline state nor the communications terminal's context information at the PDN-GW is removed. However all other operations remain the same.

Paging Communications Terminals in the Offline State

In the conventional system an entity is selected to coordinate the paging procedure. In the LTE/EPC it is always the MME, in UMTS it is always the SGSN. The table below presents in detail of how the system selects the paging co-ordination entity based on the information available for the communications terminal.

| | | Paging cordination entity | |
|---|---|---|---|
| PLMN KNOWN | ROAMING | COMMUNICATIONS TERMINAL STATE: ATTACHED | COMMUNICATIONS TERMINAL STATE: OFFLINE |
| Yes (see note 1) | No No | MME SGSN | VMME VMME (if the S3' or S4' are supported) or VSGSN (if legacy node) |

Note 1:
It is assumed that the PLMN in which the communications terminal resides is known and it is the home PLMN.

As shown in FIG. 2 notification for paging can be triggered by the U-Plane data arrival 340 or by the C-plane signalling 330 coming from an external entity. The former solution is desirable as the application server does not need to have additional complexity to handle and co-ordinate the paging/notification procedure.

As presented in the FIG. 2 according to the present technique some new interfaces are introduced into the architecture of the mobile telecommunications network, which are:

Sx' interface 309 (which can be internal, which can be typically based on the diameter protocol), S11' interface 307 based on the S11 interface (based on the extended GTPC protocol)

S4' interface 308 based on the C-Pane part of the S4 interface (based on the extended GTPC protocols) or the S3' interface Gn' interface based on the C-Pane part of the Gn (based on the GTP-C protocol) and is used to interwork with the legacy SGSN).

Gx' interface (which can be internal which can be typically based on the diameter or GTP-C protocol)

Furthermore some additional functions are introduced which are:

PDN-GW: The PDN-GW 302 functional entity has a new function to request the paging for the offline terminals when the location of the communications terminal is known with the granularity of the home PLMN. The MM context information is pushed to the VMME via the PDN-GW when the terminal is moved into the Offline state. The PDN-GW can also be thought as a proxy MME or virtual MME (VMME) for the communications terminal in the MM_Offline state in the case when the VMME and PDN-GW are co-located. This node is also an anchor point for any data coming from the PDN networks. Please note there might be several PDN-GWs used by the communications terminal and all of them will support these enhanced functions.

VMME: The VMME 301 is a logical entity which stores the UE's MM context information (or a subset of it) when the mobile communications terminal is in the offline state. The VMME also initiates and supervises the paging procedure for the terminals in the offline state and may assist in the establishment the bearers when the terminal is to be moved back to the attached state. The VMME assists a new serving MME in the creation of the communication terminal's MM context information based on its stored UE's context data.

PLMN-GW: The PLMN-GW 305 is a C-Plane entity which is accessible from the outside of the HPLMN for communication with the VMME entit(y/ies). When the application resides on the application server, the amount of information exchanged from the PLMN may be restricted. As such it may be more difficult to push the MM_context information to this entity due to operators concerns. However the PLMN-GW 305 is used by the application server to trigger the paging procedure in the PLMN (e.g. the PLMN-GW contacts the VMME).

As will be appreciated from the explanation above for U-plane and C-plane triggering 330, 340 can be made by the U-Plane data arrival or by the C-plane signaling coming from externally to the PLMN entity. The former solution is desirable as the application server does not need to have additional complexity to handle and co-ordinate the paging/notification procedure. The latter can be used also to address more generalized scenario when the PLMN is not known or the communications terminal is not allocated the IP address by the HPLMN.

The communications terminal 103 in the Offline state still has the IP address(es) allocated despite introduction of a new MM-Offline state. The PDN-GW 302 is a suitable entity to be the first point of contact for data arriving to the PLMN. One advantage is that this architecture is linked with the subscription controlled by the PLMN. The VMME logical entity will likely be under the control of the PLMN operator in the same way as the PDN-GW is.

The C-Plane approach requires the trigger to come from the application residing on the application server. That requires the application to have a reachability status of the communications terminal.

The U-Plane based triggers approach conceals this information from the application server as there is no need to disclose it to the application server because the VMME is managed by the Home PLMN. Whereas the PLMN-GW helps the operator to conceal some network information from third parties when the C-Plane triggers are used.

In the following examples, the VMME 301 and PDN-GW 302 respond to a "trigger event" to cause a global paging message to be transmitted throughout the network.

The paging procedure depends on whether some assumptions can be made on the location of the communications terminal:

The communications terminal's current location within the PLMN may or may not be known. For the offline terminals it is assumed that the location of the communications terminal is not known or cannot be ascertained with confidence. However the tracking area(s) where the UE was last seen or the tracking area(s) where the communication terminal is located during reporting its presence may be used to restrict the initial scope of the paging message distribution to allow "intelligent" hierarchical paging.

The PLMN in which the communications terminal resides is assumed to be known for the example of non-roaming scenarios, which therefore corresponds to the Home PLMN. In this example, the communications terminal is in the offline state in which paging is triggered across the whole home PLMN. For example this could be achieved using the cell broadcast (the so called the CBC), the BCCH channel, the MBMS system if available (e.g. the MCCH) or the legacy or a new paging channel with the long/extremely Long DRX cycles.

The paging procedure facilitates the system in the following:
Locate/notify the communications terminal within the PLMN
Once the communications terminal contacts the network and the PDN-GW the S5/S1/radio bearers are established
The VMME pushes the context back to the MME which triggers the MME. Then the S5 bearer(s) are established. The MME coordinates the establishment of the bearers as in the legacy architecture i.e. S1/Radio Bearers (MME+eNB). Once the VMME has triggered the S5 bearer(s) to the PDN-GW(s) to be established, the other VMME(s) shall remove their MM context(s).

If the legacy global paging is used the system may employ paging strategies. For example, the system may page certain geographical regions/areas selectively as it is likely that communications terminals will generate delay tolerant traffic. However it may also be preferable to contact the communications terminal in the shortest time possible which would require more rapid paging response by reducing the number of paging stages. In the extreme case a global paging is used.

The examples of U-plane triggering shown and C-plane triggering shown in FIG. 2 will be explained in more detail in the following sections:
User Plane Trigger Example As will be understood, the communications terminal is paged if there is downlink control data or downlink user data to be received. In the downlink user data case, the PDN-GW 302 is arranged to route downlink data packets from sources which may be routed from the external network. If an ingress data packet is detected with a destination IP address corresponding to one of the offline mode communications terminals, the PDN-GW 302 is arranged to send an alert message to the VMME 301. In some examples the alert message includes an indication of the identity of the offline state communications terminal associated with the detected IP address in the data packet as the PDN-GW holds the UE's context information for the terminals in the offline state.

Upon receipt of the alert message, the VMME 301 identifies the modified GUTI associated with the offline state of the communications terminal to which the incoming data packet is addressed and triggers a paging command via the MME 106 to all the eNodebs 102 in the network. The paging command typically includes the GUTI or at least some part of the GUTI that can uniquely identify the communications terminal such as the M-TMSI+VMME identifier or the S-TMSI+MME Group ID (optionally if distinct VMME codes are used in the system). In a conventional system the S-TMSI is used to page in the E-UTRAN, the GUTI is used in the Core. In this case the RAN paging needs to be extended to include also the MME Group id if there are several VMMEs in the system.

It will be understood that although the diagram of FIG. 2 shows only a single MME 106, in larger networks there may be multiple MMEs. In this case, all the MMEs will trigger the transmission of the paging message. In some examples, the trigger may be delivered via the direct interface between the VMME and the MME (S11' interface) or might be delivered via the modified protocol messages over the S5/S11 interfaces and the Sx interface 309.

Upon receipt of the paging command, each eNB 102 transmits a paging message within its cell in accordance with a conventional arrangement. Once a communications terminal in the offline state receives a paging message including an identifier that it recognises as its own, the communications terminal is operable to transition to the attached state including transmitting a service request and thereby establishing the required logical connections to receive the downlink data. During this procedure, signalling data confirming successful receipt of the paging message is sent from the communications terminal to the VMME 301 via the MME 106. The GUTI allocated by the VMME is used by the MME to route the response to the VMME. The VMME 301 is then arranged to send the communications terminal's EPS MM context information to the MME 106 which in the case there are multiple S-GWs selects the appropriate S-GW 104 and establishes the appropriate S5 bearers with the PDN-GW 302 according to a conventional arrangement. At this stage the MME 106 updates the communications terminal's EPS MM context information. The communications terminal's PDN-GW context information is also updated to reflect new information such as e.g. the S-GW used to terminate the S5 interface. Upon successful establishment of these bearers the VMME 301 deletes the old EPS MM context information associated with the communications terminal that was stored when the communications terminal entered the offline state. The MME 106 then proceeds to establish the appropriate S1 bearers as is known in the art and establish the relevant radio connections which trigger the communications terminal to transition to the connected state. The MME 106 allocates to the communications terminal a new GUTI which is signalled to the communications terminal and the old GUTI is deleted. Similarly, the communications terminal discards the old GUTI if a new one has been allocated.

Control Plane Trigger Example

The user plane example is based on the PDN-GW 302 triggering the paging process by recognising incoming packets (the ingress to the EPS network) addressed to a communications terminal in the offline state. However, in some examples, particularly the transmission of downlink control data, rather than using the PDN-GW 302 as the paging coordination entity an application can be located on the application server 304 which can request that the communications terminal is paged.

In this example, rather than the paging process being triggered by the PDN-GW 302 detecting an appropriately addressed downlink data packet, the PLMN-GW 305, connected to the application server 304 triggers the paging process by sending a paging request message to the VMME 301. Once the paging request message is received by the VMME 301, the paging process is commenced as described above for the user plane data example.

In some examples, when generating the paging request, the PLMN-GW 305 will use the IMSI of the communications terminal. In other examples, the PLMN-GW will use another identity (e.g. fully qualified Domain Name (FQDN), URI (Uniform Resource Identifier) or URN (Uniform Resource Name)) which the PLMN can map onto communications terminal's IMSI. When the VMME 301 has determined that the paging process has been successful, the VMME 301 sends a confirmation message to the PLMN-GW 305 which informs the application server 304 as appropriate.

State Machines for the Offline State

Figure 3A:
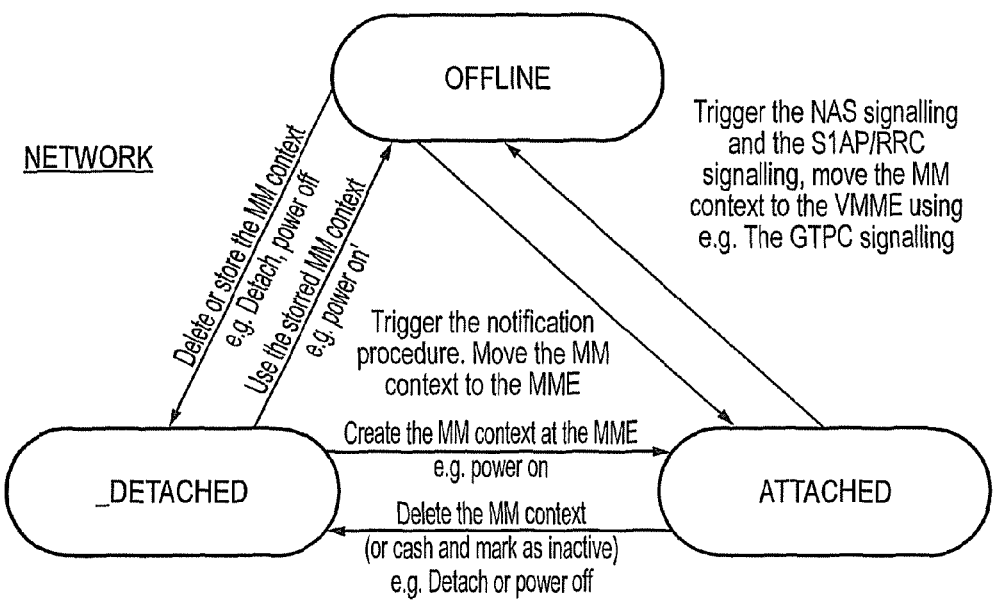
FIGS. 3a and 3b provide schematic diagrams illustrating state machines implemented at the network and a communications terminal respectively arranged in accordance with an example of the present technique.
Figure 3B:
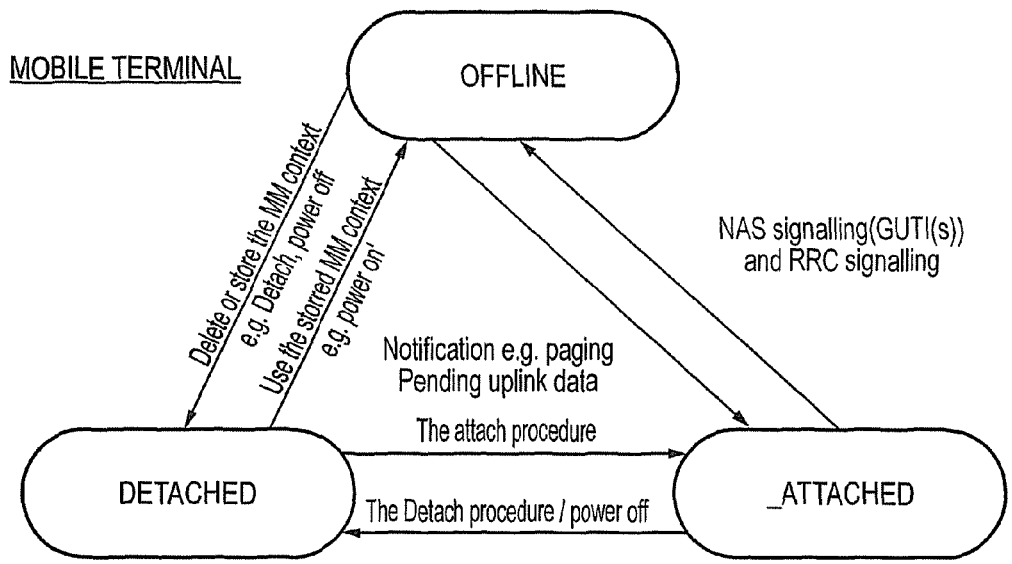

In some embodiments a state machine representing the operation of mobility management (MM) is extended to introduce another state, the so-called the MM Offline state. The finite state machine with all transitions is presented FIGS. 3*a* and 3*b*, which provide schematic diagrams illustrating examples of state machines implementing the offline state associated with embodiments of the present invention. It will be understood that the "attached" state collectively represents either the connected state or the idle state. FIG. 3*a* shows an example of a state machine operating at the network (i.e. the VMME and MME) for an individual communications terminal. FIG. 3*b* shows an example of a state machine operating at the communications terminal. As can be seen from FIGS. 8*a* and 8*b*, the states at both the communications terminal and the network transition from the detached state to the attached or offline state when the communications terminal is powered on. The reverse occurs when the communications terminal is powered off. Transitioning from the offline state to the attached state can be triggered by network notification, such as a paging message or by the communications terminal if there is any pending uplink data to be sent.

One should bear in mind that in the conventional system two instances of these state machines reside in the system i.e. at the communications terminal and in the MME/SGSN. In this invention there might be more than two instances of this state machine when the communications terminal is in the MM_Offline state i.e. at the communications terminal and at all VMME associated with the PDN-GW(s) the communications terminal use(s) (in total 2+).

These MM states are characterised in the following way:
MM-Detached:
  MM-detached: the communications terminal's location is not known and as such the communications terminal cannot be contacted. It is understood that the communications terminal is not reachable.
MM-Attached:
  MM-attached: the communications terminal is registered in the system and it is understood that the communications terminal is reachable. Legacy methods are used to track the communications terminal location in the IDLE mode (i.e. the tracking area update procedures in the LTE/EPC system) and in the connected mode (handover procedures)). The IP address is allocated (or not if the UMTS/GPRS is used which required the PDP context to be established).
  When the communications terminal is moved to the MM_Offline state, the MME used the GTP-C protocol to release the S5 bearer(s) towards the PDN-GW and push the MME context onto the VMME (or VMMEs). The NAS and S1AP/RRC signalling are used to inform the communications terminal to move to the MM_Offline state (NAS signalling is also required since a new GUTI/GUTIs are allocated)
MM-Offline:
MM-offline: In this state the following applies:
  The communications terminal has the IP address(es) allocated
  The context at the MME has been invalidated at the time of communications terminal's transition to the MM_offline state. Then the MM context is pushed to the VMME(s).
  Optionally the communications terminal may be configured also to notify its presence on periodic basis. For this purpose the modified tracking area update procedure may be used. If the communications terminal fails to do so, the PLMN the communications terminal is using is declared as unknown
  No legacy tracking area update procedures are used when the communications terminal moves between location areas (LAs)

The NAS signalling is used to move the communications terminal to the MME_Offline state the paging or other notification methods can be used to move the communications terminal out of this state.

In this state the communications terminal is not allowed to trigger any NAS ESM (EPS session management) procedures.

The communications terminal if authorised by the network may be allowed to request to be moved to the attached state. This is typically the case when the UE has some pending data to be sent.

The communications terminal must be in the MM_Attached state in order to be able to move to the MM_Offline state. Once the communications terminal is in the MM_Offline state the only possible transition is to the MM_Attached state.

In the MM_Offline state the communications terminal does not update the network with its current location. However the communications terminal may be able to listen to the broadcast channel or paging channels which would typically require a very long DRX cycle.

Terminal may not be required if configured to check its presence in the home PLMN the frequency of which is defined by a timer value. In general both parameters (the PLMN check timer value and the DRX cycle) are configurable by the operator (per communications terminal or per system) and they depend on particular operator constraints and deployments or the communication terminal's subscription information.

The communications terminal may be triggered by the network to move to the MM_ATTACHED state by the notification procedure. The communications terminal may also autonomously decide to move to the MM_ATTACHED state if some triggering conditions are met. However the terminal must seek the consent of the network to do so. The communications terminal would typically use the modified version of the NAS Service Request message.

In some cases the communications terminal may remember whether the power was switched off while the communications terminal was in the MM_Offline state or not. That will have impact on the procedures triggered when the power is switched on. This feature may depend on the communications terminal category/capabilities or be based on the subscription information or system configuration. This can be communicated during the attach procedure. An advantage is therefore provided because a communications terminal can avoid scenarios when frequent power on/off generates excessive signalling in the network.

Globally Unique Temporary Identifier

Figure 4:
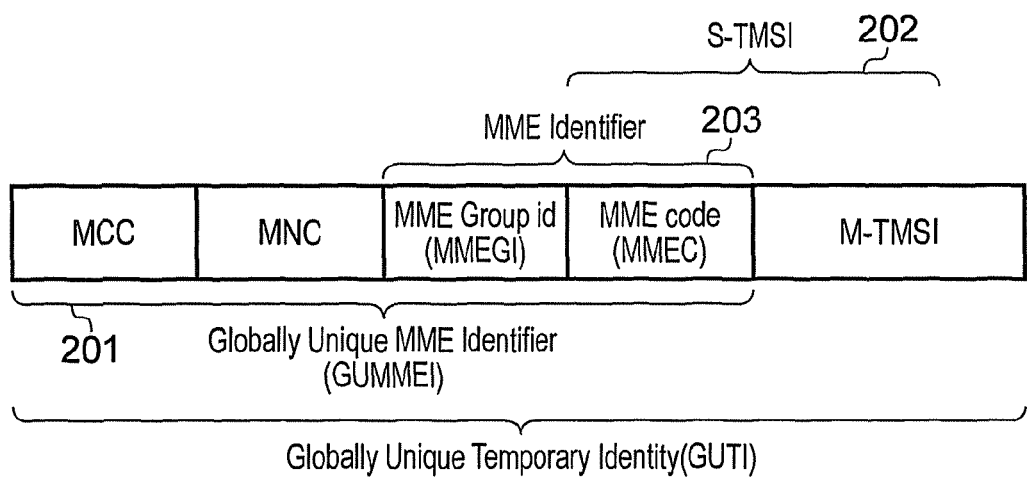
FIG. 4 provides a schematic diagram showing an example of the composition of a conventional Globally Unique Temporary Identifier (GUTI)

When a communications terminal first registers with the network (and is therefore either in the idle or connected state) an IP address is passed to the communications terminal 103 by the PDN-GW 105 (the IP address may be allocated by the PDN-GW or the external network i.e. the ISP) and a Globally Unique Temporary Identifier (GUTI) is allocated to the communications terminal 103 by the MME 106. The PDN-GW 105 stores the IP address and the MME 106 stores the GUTI. The composition of a conventional GUTI is shown in FIG. 4. As can be seen, the GUTI comprises a first portion 201 that uniquely identifies the MME 106 and a second portion 202 that uniquely identifies that communications terminal 103. The first portion includes a MME identifier 203.

A Globally Unique Temporary Identity (GUTI) is used to provide an unambiguous identification of a communications terminal that does not reveal a user's permanent identity in the Evolved Packet System (EPS). It is also used to identify the serving MME and network.

The GUTI is allocated when the communications terminal is being attached to the system. It is proposed that the GUTI is also used for the purpose of the communications terminal identification during paging and for the purpose of routing of the C-Plane signalling to the appropriate nodes in the system when the terminal is in the offline state. This might require updating of the existing routing functions in the system e.g. at the eNB, MME, SGW. However as explained above, when the communications terminal moves to the MM_Offline state, a new GUTI is allocated by the VMME and is used in all signalling initiated by the communications terminal or the network e.g. location updating procedure and the paging. This location updating procedure has been overloaded from a functional point of view as it does not indicate the communications terminal presence in a particular location area (LA) but merely serves as the indication that the terminal still resides in the PLMN. This procedure is used if the communications terminal has been requested to indicate its presence in the PLMN periodically. The GUTI is included in the Tracking area Update request message. A GUTI has good properties identifying not only a communications terminal but network entities as well as the country and the PLMN to which the communications terminal has been attached. When the communications terminal triggers the Location Update procedure, the U-plane bearers are not allocated (i.e. The Tracking Area Update Request message) in the MM_Offline state. As explained above, when the communications terminal enters the offline state the old GUTI is replaced by a new GUTI allocated by the VMME.

When a communications terminal moves to the MM_Offline state, the MM context is moved to other network entities. The old GUTI which is allocated by the MME for communications terminals in the MM_Attached state could potentially be allocated by any other MME to another communications terminal. This re-allocation of the same GUTI could cause problems when the communications terminal in the MM_Offline state is moved back to the MM_Attached state in the area controlled by the same MME. To resolve this problem embodiments of the present technique operate as follows:

Once the communications terminal is moved to the MM_Offline state the GUTI is modified The MME Code is changed to indicate a virtual MME The MME Group Id is modified to reflect a virtual MMEs group.

A new M-TMSI is allocated by the VMME.

The virtual MME Group/MME Ids shall not be used by real MMEs/MME groups.

A new GUTI is allocated by a new serving MME when the communications terminal is moved back to the MM_Attached state. When the MM context is moved to the VMME (PDN-GW), the MME/MME group Ids in the GUTI are updated and a new M-TMSI is allocated. These new GUTIs are communicated to the communications terminal in the NAS messages. Allocating identities (i.e. MME/MME group Ids) to virtual components helps to route signalling to these components.

Communications Terminal Operation

A Communications terminal may be arranged to enter the offline state due to any appropriate circumstance. For example, if the communications terminal forms an MTC type device, it may be arranged to remain in the offline state at all times unless it is sending or receiving data. In other examples, communications terminals may be arranged to enter the offline state when triggered by an event such as an amount of available energy within an internal power supply dropping below a threshold level. In other examples, the communications terminal may be arranged to enter the offline state on receipt of a command from the network. In yet further examples, the communications terminal may be arranged to remain in the offline state unless it is sending or receiving data or a determination is made either at the communications terminal or the network that the communications terminal should enter the attached state in order that its location be tracked by the network so that it can receive paging messages more quickly than it would do were it in the offline state.

Typically when a communications terminal is in the offline state it would not need to update the network with its current location. However, in some examples the communications terminal may optionally indicate its presence in the network i.e. to indicate its presence in the PLMN periodically in a similar manner to the legacy periodic tracking area/location updating procedure. However, the communications terminal would indicate its presence in the PLMN and optionally signal the current local area/tracking area LA/TA. In some examples the communications terminal triggers this procedure when it crosses a tracking area boundary of an outer boundary of a predetermined set of tracking areas. This is because a time interval between consecutive updates is much longer than for conventional communications terminals performing periodic tracking area/location updates. The interval between tracking area/location area updates at which this happens can be a configurable parameter linked with the communications terminal subscription.

In another example, when in the offline mode the communications terminal is arranged to detect when it leaves the network in order to trigger a location update procedure to register in a new PLMN. However, due to lower probability of this event occurring, for example when an operator has coverage over a large geographical region, the communications terminal may not be required to check its presence in its home network frequently. The frequency with which the communications terminal checks its presence can be configurable by the network operator.

As explained above, the communications terminal can be triggered by a paging message to move to the attached state by the paging procedure. However, in some examples, the communications terminal may also autonomously decide to move to the attached state if various triggering conditions are met such as pending transmission of uplink user data. However in the latter example the network must express its consent for the terminal to do so.

In some examples the DRX (Discontinuous Reception) cycle used by the communications terminal (i.e. the periodicity with which the paging channel is monitored) is configurable. For example, to conserve power, a relatively long DRX cycle can be used. On the other hand, to check for pending downlink data more frequently a shortened DRX cycle can be used. Typically, longer DRX would be used for the communications terminals in the offline state. This can be done by the HPLMN and typically communicated to the communications terminal when it is commanded to move to the offline state. The paging occasions the communications terminal needs to monitor depend on its IMSI as well as the DRX parameters configured by the PLMN beforehand.

It also shall be noted that the communications terminal while in the MM_Offline state may listen to new channels to receive notifications for example:
Special BCCH information e.g. new SIB with low periodicity
A new paging channel
An existing paging channel
The CBC (Cell Broadcast System)
The MBMS e.g. the MCCH or MTCH channel
The communications terminal may be able to search and discriminate whether any of these means is available usually by listing to the BCCH information where the supported features are advertised/broadcasted.

When in the process of making transition to the MM_Attached and Connected states, the communications terminal receives the RRC request to establish SRBs and data bearers as well the NAS message. A new GUTI is allocated via the NAS signalling exchange. The old GUTI is discarded.

The communications terminal may also be told during the NAS signalling exchange whether it shall move back autonomously to the MM_Offline or not when the current data exchange has been completed.

In some examples the communications terminal may be configured to confirm periodically the PLMN it is currently in. Typically on the expiry of the timer the communications terminal is required to trigger the modified tracking area update procedure (This feature is equivalent to periodic tracking area update but now the scope of this update is the PLMN and not the current Location area (LA)).

As explained above with reference to FIG. 2, notification can be triggered by the U-Plane data arrival 340 or by the C-plane signalling 330 coming from the external entity. The former solution is desirable as the application server does not need to have additional complexity to handle and co-ordinate the paging/notification procedure.

Also the communications terminal in the Offline state still has the IP address allocated due to the introduction of the new MM-Offline state so the PDN-GW seems to be a suitable entity to be the first point of contact for data arriving to the PLMN. One advantage is that this architecture is linked with the subscription controlled by the PLMN.

The C-Plane approach requires the trigger to come from the external entity residing for example an application server. This requires that the application server has can reach the communications terminal. The former (i.e. the U-Plane based triggers) approach conceals this information from the application server as there is no need to disclose it to the application server because the PCE is managed by the HPLMN.

Network Operation
When the network pages the communications terminal in the MM_Offline state the following steps happen:
If the PLMN is known the VMME at the PDN-GW in the home PLMN triggers paging in MME(s) in the HPLMN
The paging id used is S-TMSI if some MME codes are globally reserved for Virtual MME or the paging id is extended to include also the MMEGI
The MME(real) just forwards the paging message to eNBs.
The communications terminal searches for the S-TMSI or STMSI and MMEGI depending on the operator's policy for the allocation of internal system identifiers.
The MME is a stateless device and forwards/routes the communications terminal's response to the VMME (the PDN-GW if it is co-located) including its own address.
The VMME based on this address pushes the MM context onto this real MME which selects the S-GW and triggers the process of the s5 bearers establishment. Upon successful establishment of these bearers the VMME(s) delete the MM Context(s). The real MME is also establishing the S1 bearers and RRC connection (SRBs) which triggers the communications terminal to move to the MM_Registered and ECM-Connected states.
The MME allocated a new GUTI, the old one is deleted
The communications terminal discards the old GUTI(s) when a new one has been allocated.

Finally the Data Radio Bearers are established if the network deems it necessary.

If the communications terminal has been configured to provide a periodic PLMN update, the network assumes that the communications terminal's PLMN is unknown if no update has been sent by the communications terminal. When the communications terminal provides the PLMN update, only the first VMME at the PDN-GW is contacted. Alternatively all the VMME(s) are contacted. If the former option is used and there are multiple PDN-GWs used, the contacted VMME and its PDN-GW informs other VMME(s) that the update has been received.

The description provided so far has dealt with the scenario when the paging is triggered by the U-Plane data arriving to the anchor point i.e. the home PDN-GW(s). However the application server might also trigger the paging. In this scenario the server might be managed by the third parties. The PLMN-GW is used to trigger the paging. The PLMN-GW requests the VMME(s) to coordinate the paging in a similar way as in the scenario described above. The applications will not typically use the IMSI but another communications terminal identity which the PLMN can map onto communications terminal's IMSI. The amount of information which is available to the application may be restricted unless the operator will disclose it to the third parties. When the notification procedure e.g. the paging was successful the PLMN-GW informs the application server about it and may also send some auxiliary information.

The PLMN-GW needs to obtain information from the HSS about the mapping between the id and the IMSI and the address of the VMME associated with the first PDN connection which has been established at the attach time. This VMME will be used to co-ordinate the paging Alternative Implementation It is also possible to arrange the system to have just one VMME always associated with the first PDN connection and PDN-GW. Other PDN-GW(s) if used, for example several PDN connections and IP addresses could be triggered by the U-Plane data. In this case the PDN-GW needs to find routing information, generate and forward the C-Plane trigger to the VMME. This is possible as all PDN-GW could store the information about the address of the VMME associated with the first PDN connection in order to be able to locate the VMME. An advantage is that just one GUTI is allocated also in the scenario when several PDN-GWs are used and the communications terminal needs to monitor just one paging identity when in the MM_Offline state.

When the MME moves the communications terminal to MM_Offline state, it needs to release the S5 bearers to the PDN-GW(s) and this signalling (the GTPC signalling) can be used to update this piece of information in all involved PDN-GWs.

As for the network operation mentioned above paging can be triggered by the U-Plane data arriving to the anchor point i.e. the Home PDN-GW. Alternatively the application server using the C-Plane can also trigger the paging via the intermediary entity called the PLMN-GW. The application server is typically managed by the third parties. The PLMN-GW requests the VMME to initiate and coordinate the paging in a similar way as in the scenario described above. The only difference is the application server may not use the IMSI but another communications terminal identity which the PLMN can translate to communications terminal's IMSI. Also the amount of information which is available to the application server may be restricted unless the operator will disclose it to some third parties. When the paging was successful the PLMN-GW informs the application server about it and sends some information (e.g. the IP address) allowing the server to send data to the communications terminal via the PDN-GW. Alternatively small amount of data may be delivered together with the trigger indication.

Summary of Operation

According to example embodiments of the present technique, the operation of the network and the communications terminals in accordance with the procedures described above, which form example embodiments are summarised by the call flow diagrams provided in FIGS. 5a, 5b, 6a, 6b, 7a and 7b. Furthermore diagrams illustrating the active and passive state of some of the core network entities of FIG. 2 when a communications terminal is in the offline state and the attached state are provided respectively in FIGS. 8 and 9.

Figure 5A:
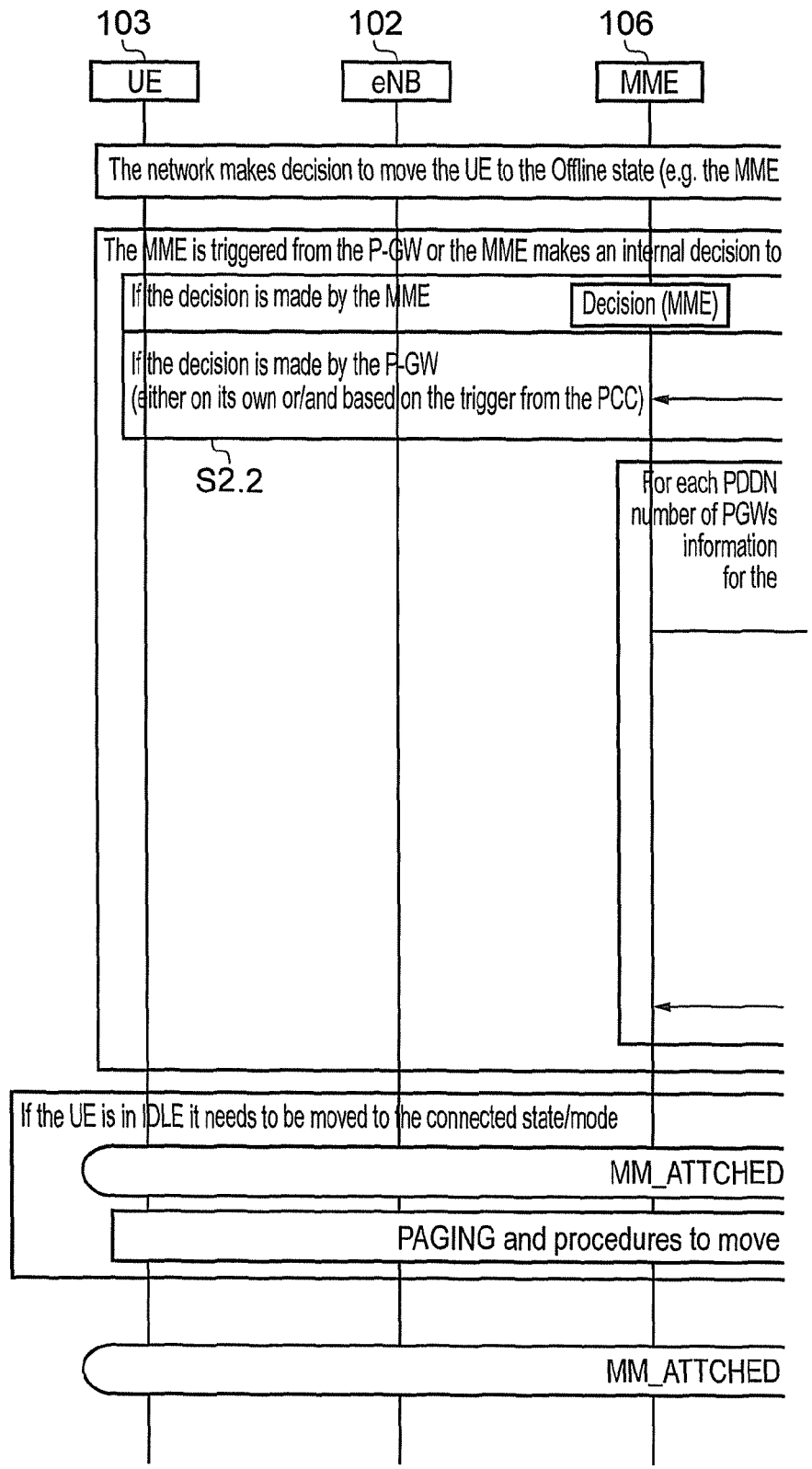
FIGS. 5a and 5b provides a call flow diagram illustrating an example embodiment of the present technique illustrating operations of a communications terminal and a mobile communications network when the communications terminal enters an offline state.
Figure 5A:
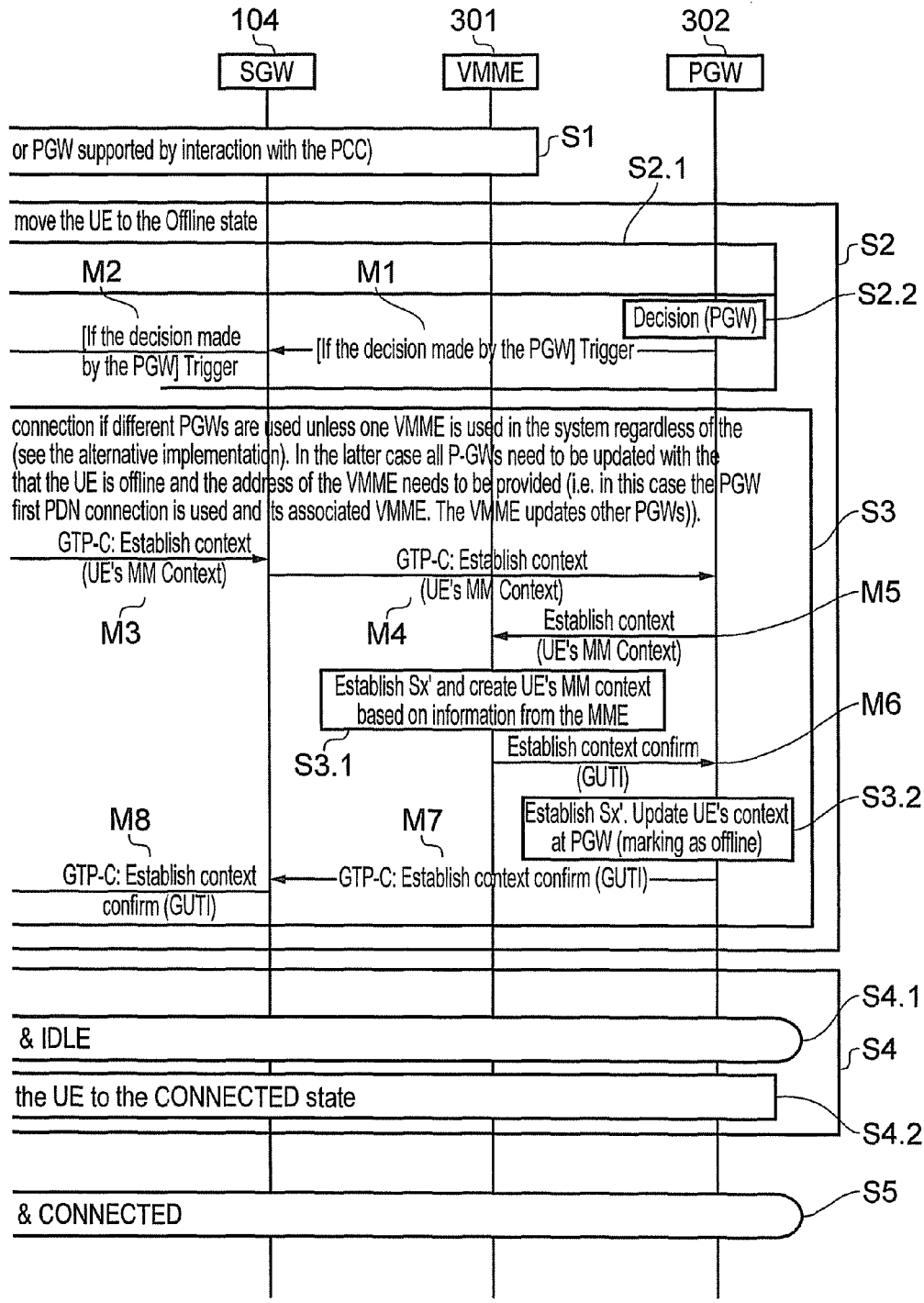
Figure 5B:
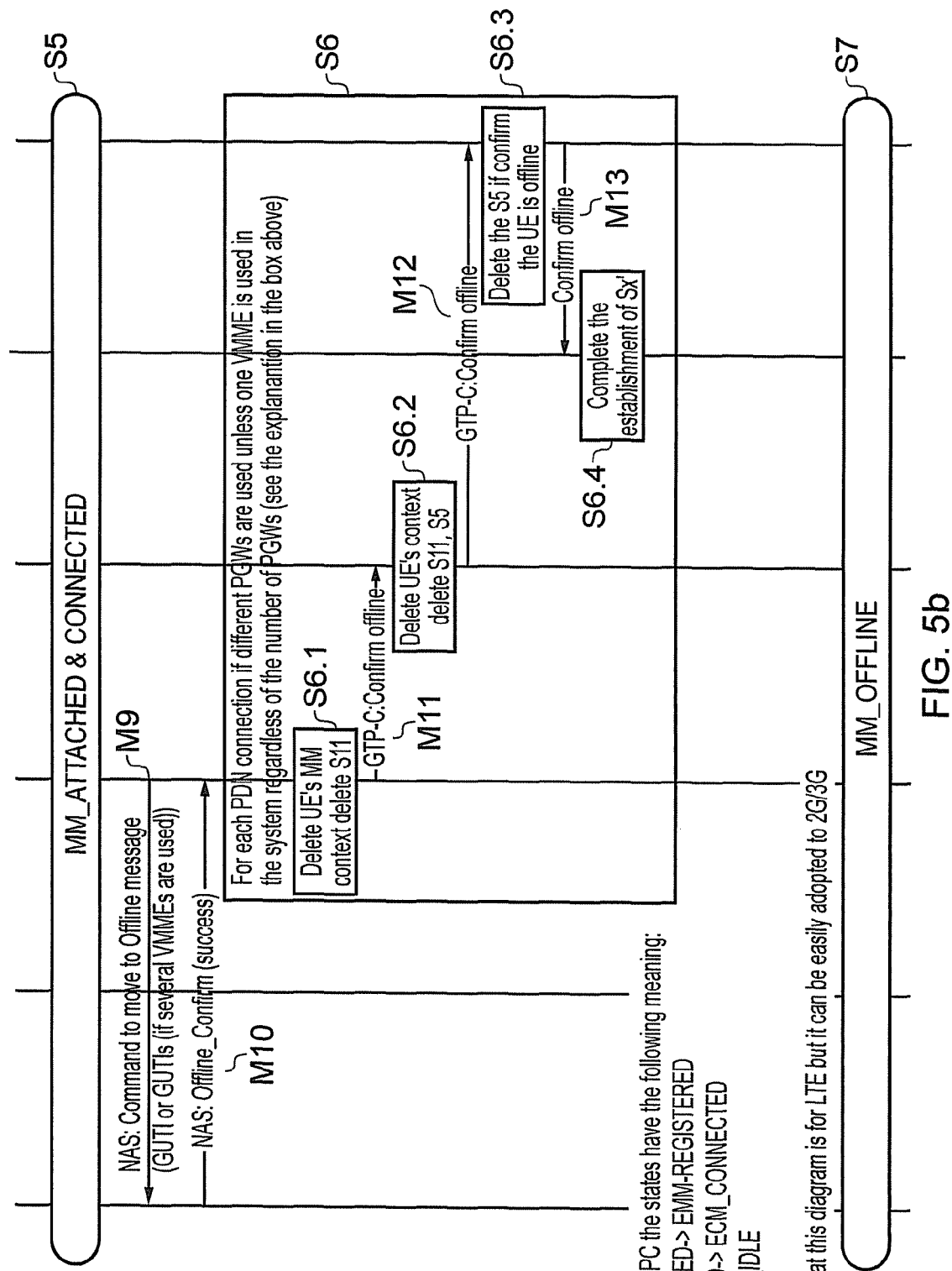

FIGS. 5a and 5b form together a flow diagram illustrating the operation of the various elements of the mobile communications system as the communications terminal 103 moves from an attached state to an offline state. The mobile communications terminal 103 could be in either an attached state, an idle state or a connected state, but for any of these states actions which need to be performed by the network elements to move the communications terminal to the offline state as explained above are summarized by FIG. 5.

As shown in FIG. 5a, at step 1 the network makes a decision to move the communications terminal 103 to the offline state. This can be based on a user's inactivity period, subscription information or a function of system load or a combination of the user inactivity and/or subscription information. The entity which makes the decision could be the following:

The MME 106;

The PDN-GW 302 with support of the PCC system, then the PDN-GW 302 requests from the MME 106 via the S-GW 104 to move the communications terminal to the offline state; or A combination of the MME 106 and the PDN-GW 320, which may negotiate, for example, in the roaming architecture the MME may not be capable of this functionality or VMME may have some local policies and the Home PDN-GW 302 may support this functionality or have another set of rules imposed by the home operator so some form of negotiation is required.

Supposed that the network has made the decision to move the communications terminal to the offline state, the serving MME 106 is responsible to coordinate the communications terminal's MM context transfer to the Virtual MME (s) 301. There are two variants of the solution, which are presented in the flow diagram, which are:

Variant 1: For each PDN-GW 302 used by the communications terminal there is one VMME 301. In that case the MME 106 requests the PDN-GW 302 via the S-GW 104 to request from its associated VMME 310 to establish the communications terminal's MM context based on the context information provided by the serving MME 105. This leads to the establishment by the PDN-GW 302 of the communications terminal's 103 dedicated signalling on the Sx' interface with its VMME 301. The PDN-GWs 302 also marks the communications terminal's 103 as in the offline state. The VMME(s) 301 confirm to the serving MME 106 that the context has been established including the GUTI (s) allocated for the communications terminal 103.

Variant 2: If there is just one VMME 301 by agreement it is assumed that it is associated with the PDN-GW 302 which is used for the first PDN connection established by the communications terminal 103. In this case the initial signalling is the same as in variant 1 but the VMME 301, based on the communications terminal's MM context information, requests from other PDN-GWs 302 to mark the communications terminal 103 as offline and establish the communications terminal's 103 dedicated signalling over the Sx' interface. Each PDN-GW 302 used by the communications terminal will have means to contact the VMME 301 (one for the communications terminal). The VMME 301 confirms to the serving MME 106 that the context has been established including a new GUTI allocated for the communications terminal.

Thus referring back to FIG. 5a, at step S2 the communications terminal 103 is in the attached and connected state. At step S2 the MME is triggered from the PDN-GW or the MME makes an internal decision to move the communications terminal to the offline state. The MME may decide to move the Communication terminal 103 to the offline state based on the request sent by the communication terminal 103 in a NAS message or other internal factors such as communication terminal inactivity time, operator's policies and user subscription information. Step S2 includes two possibilities for triggering the move to the offline state. In step S2.1 the decision is made by the MME 106 whereas in step S2.2 the decision is made by the PDN-GW either on its own or based on a trigger from the PCC. If the decision is made in the PDN-GW 302 then messages exchanges M1 and M2 follow in order to communicate to the MME 106 that the communications terminal 103 should move to the offline state.

In step S3 (variant 1) the UE's Context information including PDN connection information for the communications terminal is moved to the VMME 301. However, as explained above, the communications terminal 103 could have one or a plurality of PDN connections and moreover maybe served by different VMMEs. As such for each PDN connection a different PDN-GW and its associated VMME may be used, Another alternative (variant 2) is that one VMME 301 is used in the system regardless of the number of PDN-GWs then all of the PDN-GWs which have established connections to the communications terminal are updated with the information that the communications terminal 103 is offline and the address of the VMME is provided to the PDN-GWs by the MME 106. If there is more than one gateway then the VMME 301 associated with the PDN-GW for the first PDN connection is used and the context information in other PDN-GWs are updated as explained above. To this end, a message exchange follows which includes M3, M4 and M5 to establish a UE's context in the VMME 301 via the PDN-GW. At this point in step S3.1 the Sx' interface is created and a communications terminals context is communicated to the VMME 301 from the MME 106.

In message M6 the VMME 301 confirms that the context information has been established and then proceeds to issue a new GUTI. In step S3.2 the interface Sx' is established and the context information is updated at the PDN-GW with an indication that the communications terminal is offline. The PDN-GW 302 then confirms to the MME 106 via messages M7, M8 that the context has been established within the VMME 301 and passes the new GUTI of the communications terminal 103 which has been issued and against which context information for the communications terminal 103 is stored.

If the communications terminal 103 is in the idle state then it needs to be moved to the connected state (at S5) and this is performed in step S4. This is realised in step S4.2 where the communications terminal 103 is paged to move the communications terminal to the connected state (in LTE this is the ECM_Connected state) and establish NAS connectivity at S5. This is required in order to enable the serving MME 106 to send the NAS command to move the communications terminal to the offline state. The NAS command will also include the GUTI allocated by the VMME (variant 2) or GUTI(s) allocated by the VMME(s) in variant 1. The NAS message may also be used to communicate other parameters to be used by the communications terminal such as e.g. very long DRX values applicable to the offline state.

As explained above, the MME 106 issues a NAS command to the communications terminal 103 to move to the offline state. This is effective with a message M9 which includes the GUTI of the communications terminal 103. Using a message M10 the NAS command is confirmed by the communications terminal 103 to the MME 106.

As for the step S3 in step S6 (variant 2) for each PDN connection if different PDN-GWs are used steps are performed in order to move the communication terminal's context to the VMME 301. Thus, in step S6.1 the communications terminal's 103 context is deleted from the MME 106 and a GTP-C message M11 is communicated to the serving gateway 104 which also deletes the communications terminal's context in step S6.2 which includes the s11 and s5 bearers. A message M12 is then sent to the PDN-GW 302 to confirm that the communications terminal 103 has moved to an offline state and in steps S6.3 and S6.4 the PDN-GW deletes the s5 bearer and confirms that the communications terminal has moved to the offline state to the VMME 301 via message M13 and the VMME 301 in step S6.4 completes the establishment of the Sx' interface.

In step S6, upon the receipt of the confirmation from the communications terminal 103, the serving MME 106 is responsible for confirming to the network entities that the communications terminal 103 has been moved to the offline state. That leads to the removal of the communications terminal's context information from the SGW 104, deletion of the s5 bearers established for the communications terminal, deletion of any communications terminal's identities allocated for the s11 interface. Finally the serving MME deletes the communications terminal's context information, and the communications terminal is considered by the network to be in the MM offline state in step S7.

It should be noted that there are slight differences for variant 1 and variant 2 solutions, which are:
Variant 1: The MME notifies all PDN-GW(s) which notify its associated VMME(s).
Variant 2: The MME notifies all PDN-GW(s). The PDN-GW(s) will notify the VMME in the system (the same node notified by 1 to many PDN-GW(s))

Thus at the end of the flow diagram shown in FIGS. 5a and 5b at step S7 the communications terminal is in the offline state.

Figure 6A:
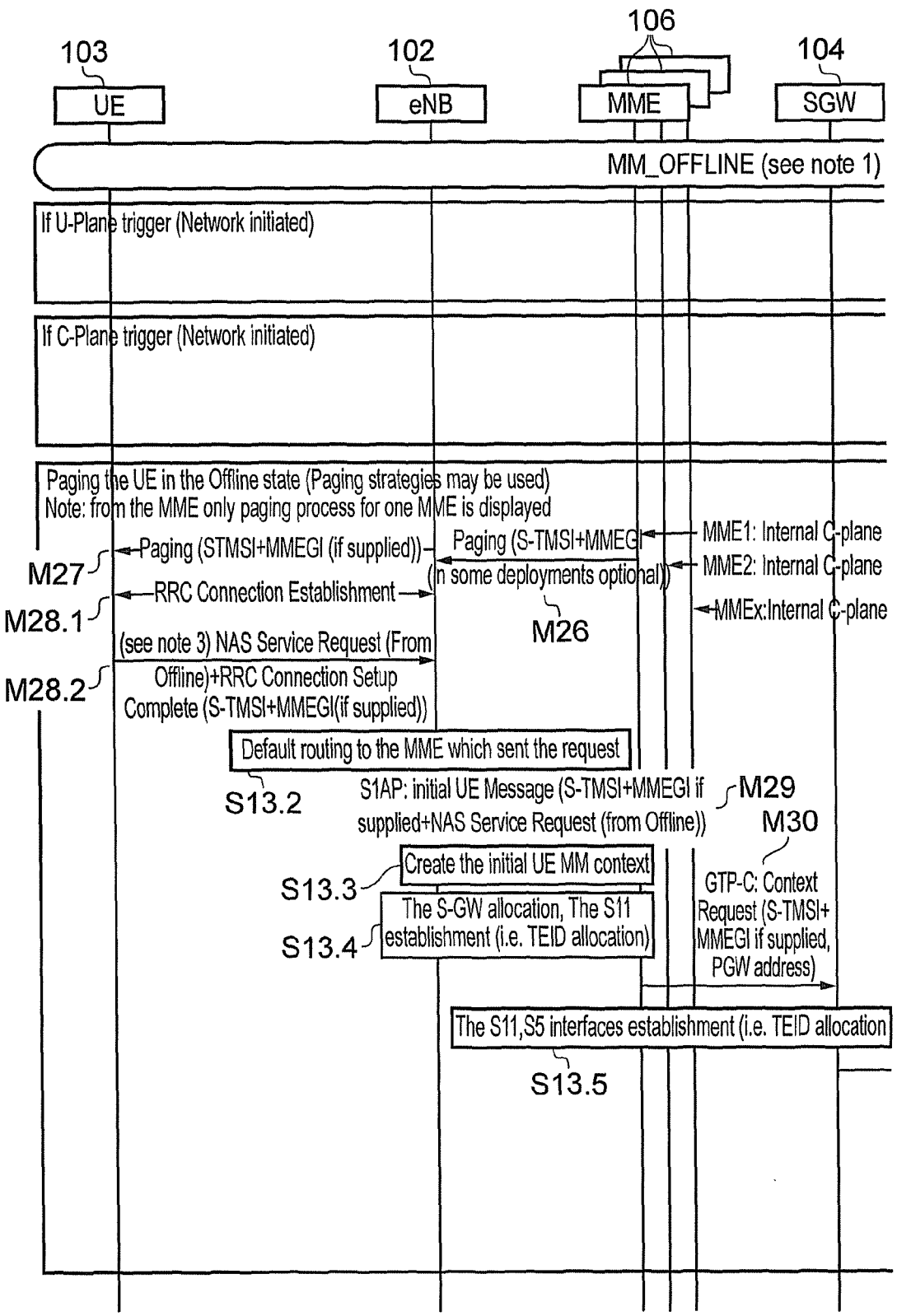
FIGS. 6a and 6b provides a call flow diagram illustrating an example embodiment of the present technique illustrating operations of a communications terminal and a mobile communications network when the communications terminal changes from an offline state to an attached state.
Figure 6A:
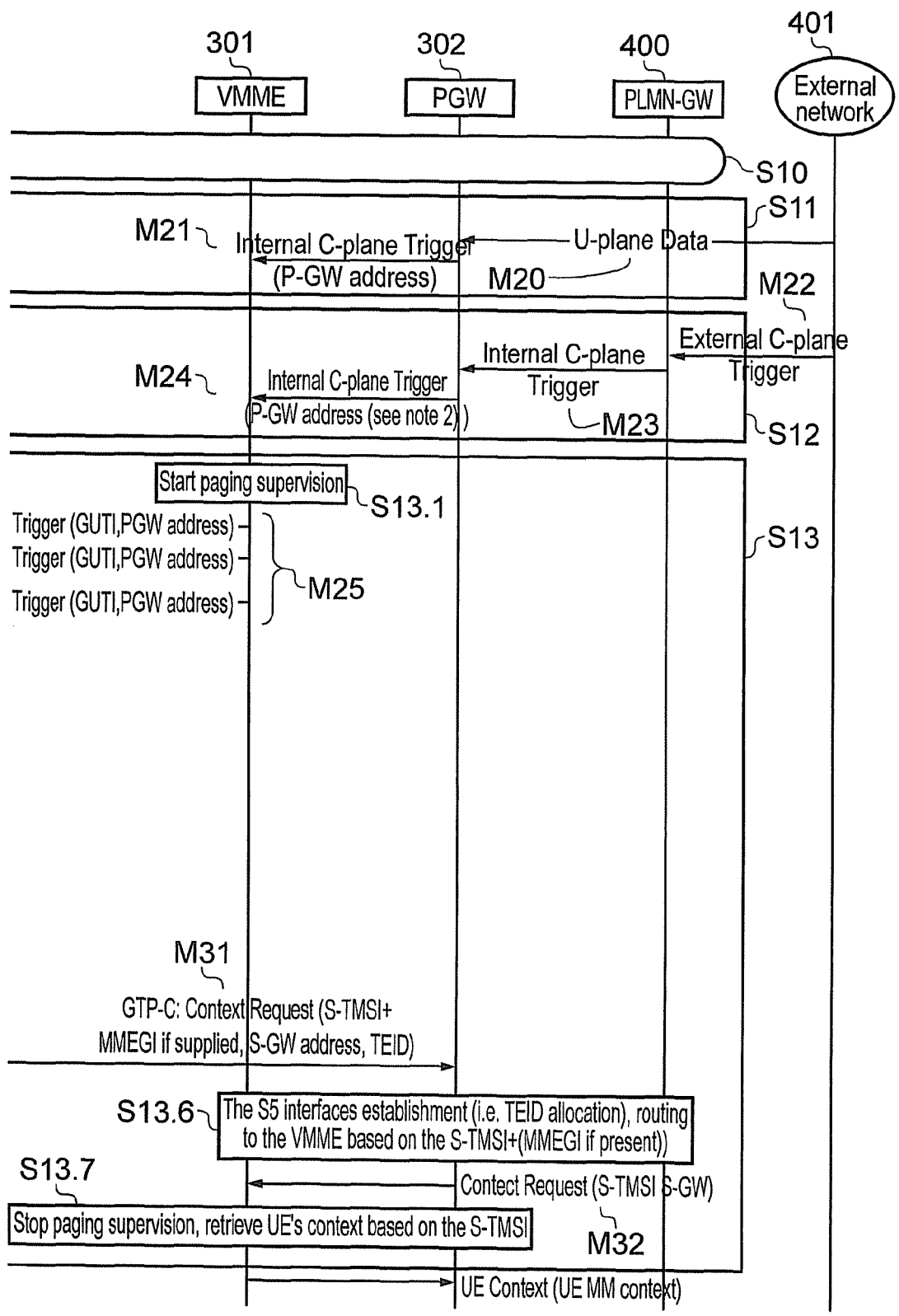
Figure 6B:
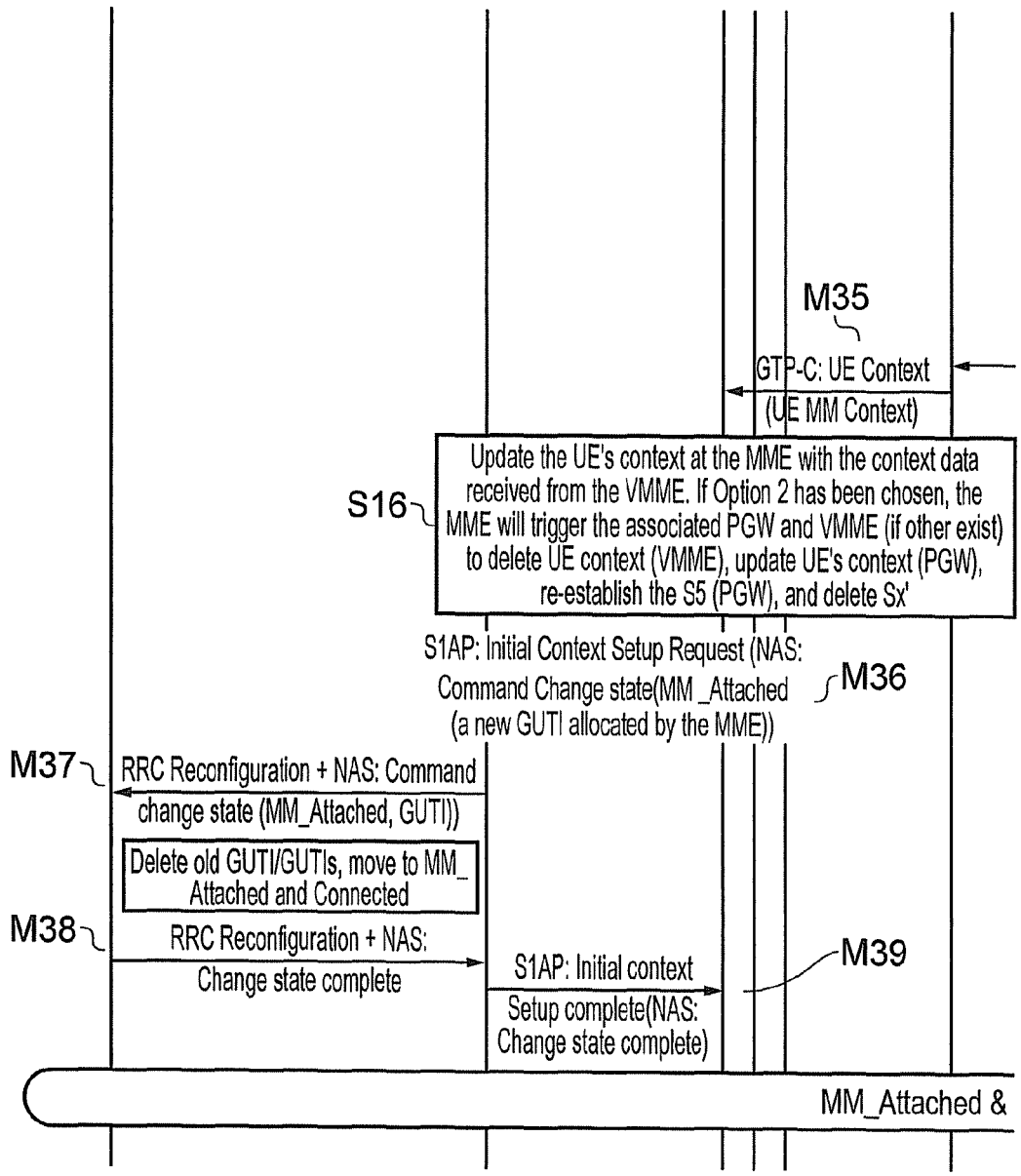
Figure 6B:
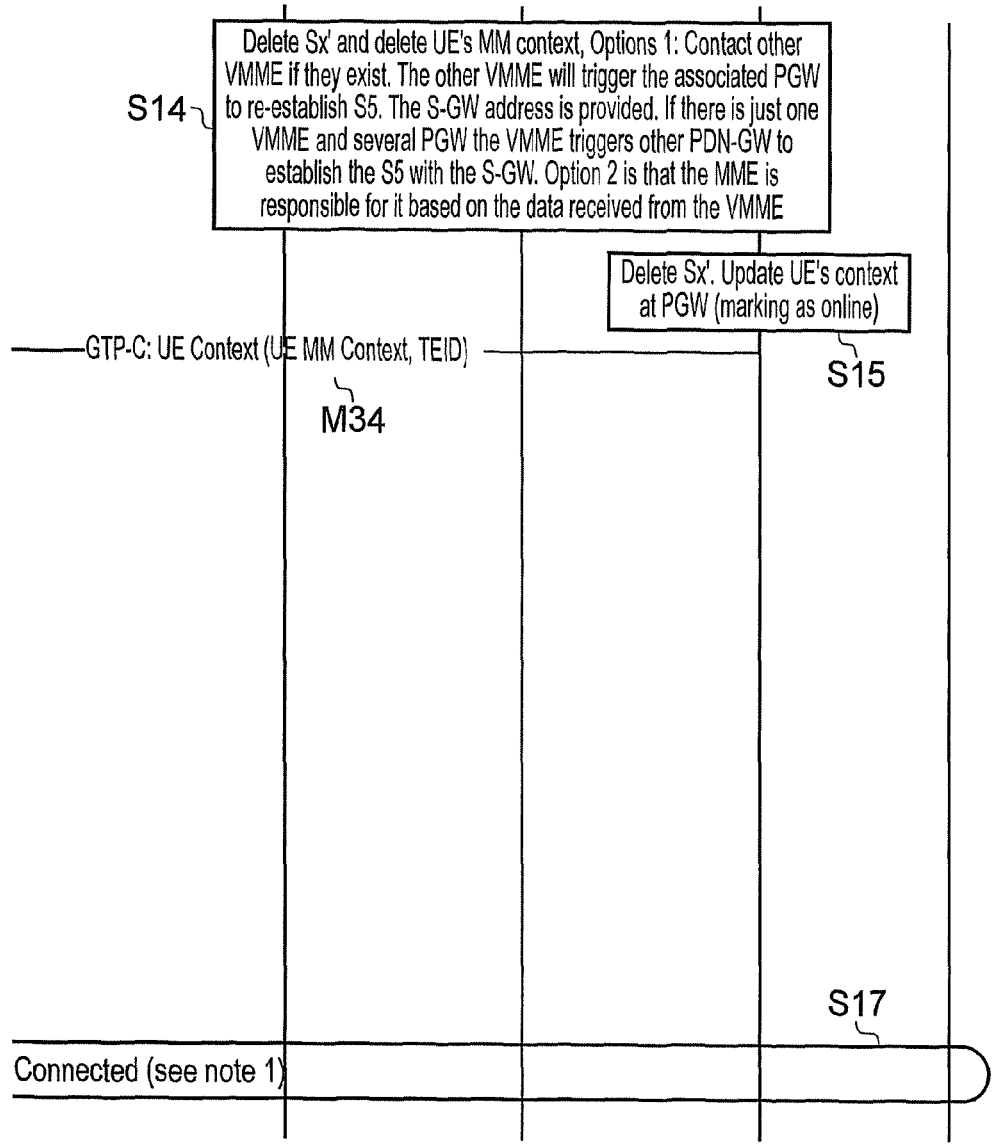

FIGS. 6a and 6b provide a flow diagram which together illustrate the process in which the communications terminal moves from an offline state to an attached state. Thus as shown in FIG. 6a the flow diagram starts with the communications terminal 103 in the offline state at state S10. When the communications terminal is offline the trigger to move the attached state may come from the network or the communications terminal 103 itself. The latter may be subject to the operator's authorisation and policies. The network initiated trigger may come as the C-Plane trigger or U-Plane (any data arriving at the PDN-GW). In the latter case the PDN-GW checks whether the communications terminal is offline. This is realised by checking whether the match has been found in the TFT filters established for the communications terminal 103 which has been marked as being in the offline state. Then the PDN-GW requests the VMME 301 providing its address (in variant 1 it is the VMME associated with the PDN-GW, in variant 2 it is the VMME associated by convention with the first PDN connection and its PDN-GW) to initiate and supervise the paging procedure (S13.1 and M25). If the C-Plane trigger is received, the PLMN-GW is used to convey the trigger to the VMME 301 (via the PDN-GW 302 or directly) which initiates the paging procedure as explained above. Note that the VMME used for the first PDN connection is always used in variant 1 and 2. The PLMN-GW obtains information about the address of the PDN-GW (or alternatively the VMME) from the HSS. Alternatively the VMME may update the PLMN-GW with this information when the communication terminal 103 is moved to the offline state. The VMME initiates and supervises the paging procedure (note that paging strategies may be applied to minimise paging load in the system). The VMME includes the PDN-GW address and the GUTI in the paging request sent to the MME(s). Therefore as shown in FIG. 6*a*, process steps S11 and S12 illustrate these two arrangements via which the communications terminal may be required to move to the attached state which are respectively via a U-plane trigger or a C-plane trigger. In the U-plane trigger U-plane data is received via message M20 which is communicated to the VMME 301 via an internal C-plane trigger using an address obtained from the PDN-GW 302 in message M21. For the C-plane example a C-plane trigger is received by a PLMN gateway 400 from an external network 401 which is message M22 and via messages M23, M24 an internal C-plane trigger is communicated from the PLMN-GW to the PDN-GW 302 and from the PDN-GW 302 to the VMME 301.

In step S13 the communications network pages the communications terminal which is in the offline state so that it can be moved to the attached state. Various paging strategies maybe used. In one example, the MME(s) requests from the eNode B(s) 102 to page the communications terminal 103.

In the example illustrated in FIG. 6*a* paging for only one MME is presented. Thus, in step S13.1 the VMME 301 having received the trigger starts the paging supervision process in step S13.1. The paging is triggered via messages M25 by the VMME 301 contacting each of the available MMEs 106 within the network to trigger paging using the GUTI provided by the VMME and the PDN-GW address. The MME(s) 106 send a paging message M26 to the eNodeBs 102 which trigger a paging of the communications terminal 103 via messages M27 to the communications terminal 103. The communication terminal 103 after detecting that it is being paged (detecting its S-TMSI and optionally MMEGI) responds requesting the establishment of the RRC connection and sending the NAS service request message in the RRC connection setup complete message M28. At step S13.2 the eNode B 102 routes a request to the MME which sent the paging request. The eNode B 102 then sends a message M29 to the MME 106 which sent the paging message to communicate the content of the NAS service request message M28 to the MME containing the S-TMSI and the MMEGI supplied by the communications terminal 301 and in response the MME 106 creates an initial context for the communications terminal is step S13.3. The NAS service request message includes the S-TMSI and MMEGI (the MMEGI is optional in some deployments if just one VMME is used). The MMEGI and S-TMSI are used by the MME 106 to route the response of the communications terminal to the VMME. In the deployment scenario when just one VMME is used the MMEGI is not required. Alternatively the PDN-GW address can be used to route the response to the PDN-GW which can forward the response to the VMME.

In step S13.4 the MME 106 arranges for the SGW 104 to allocate a bearer for communicating to the communications terminal 103 via message exchanges M30 and M31 the communications terminal's S11 interface identities and communications bearer s5 are established and at step S13.5 the serving gateway performs the process of establishing the s11 and s5 interfaces. In step S13.6 the PDN-GW allocates further components for the U-Plane path (e.g. the GTP-U TEID) and routes (based on the S-TMSI and MMEGI) the message M32 to the VMME 301. Accordingly, at step S13.7 the VMME stops the supervision of the paging of the communications terminal and retrieves the context based on the S-TMSI which it has received from the PDN-GW 302 and using a message M33 the VMME 301 communicates the context of the communications terminal to the PDN-GW 301.

Once the communications terminal 103 responds to the paging procedure, the eNode B 102 routes the response to the default MME (this is the MME which has initially sent the paging request to the eNode B). The MME creates the initial context, selects the S-GW and establishes the s11 interface for the communications terminal 103 (allocates TEIDs to be used by the communications terminal). The MME 106 sends to the SGW 104 the request for the old communications terminal's context information including the PDN-GW address. The SGW forwards the request to the PDN-GW (based on the PDN-GW address or the MMEGI+S-TMSI) establishing partially the s5 bearers for the communications terminal. The PDN-GW forwards the request to the VMME which stops paging supervision and the VMME retrieves the communications terminal's old context based on the S-TMSI. The VMME responds to the request and sends the old communications terminal's context to the MME via the PDN-GW and the SGW. This allows the s5 bearers and the s11 interface to be fully established for the communications terminal. The VMME deletes old communications terminal's context information as well as the communications terminal's identities allocated for the Sx' interface.

The re-establishment of other remaining s5 bearers for other PDN-GW may be done in two ways:

Variant 1:
  The VMME contacts other VMME if they exist. The other VMME will trigger the associated PGW to re-establish S5. The S-GW address is provided.
  If there is just one VMME and several PGW the VMME triggers other PDN-GW to establish the S5 with the S-GW Variant 2:
  The MME is responsible for the re-establishment of all other S5 bearers with other PDN-GW based on the communications terminal's context data received from the VMME(s).

Therefore as shown in FIGS. 6*a* and 6*b*, in step S14 the VMME deletes the Sx interface and the communications terminal's context information which it has stored and depending on the number of PDN connections which are available to the communications terminal the VMME 301 arranges for either all of the PDN connections to be re-established and then deletes their context or just PDN connection which is required and maintains the context for the other PDN connections.

In step S15 the Sx interface is deleted at the PDN-GW 302 and the communications terminal's context information is updated correspondingly at the MME 106 which is serving communications terminal at step S16 using messages M34, M35 from the PDN-GW 302 to the MME 106. Assuming that the network has not reported any errors the MME 106 via messages M36, M37 commands the communications terminal 101 to move to the MM_Attached and connected states. The old GUTI is not valid anymore and the new GUTI which was allocated by the MME is provided to the communications terminal 103 in messages M36 and M37. Messages M36 and M37 also initiate the radio and S1 bearers establishment which upon successful completion is confirmed and communicated to the MME 106 in massages M38, M39. The messages M38 and M39 are also used to send a NAS message confirming that the communication terminal 103 has been successfully moved to the MM_Attached state.

It should be noted that the SGW 104 may pass its address in the message to the VMME, if this VMME contacts other VMME(s) to re-establish the s5 bearers (variant 1). The new serving MME establishes the full communications terminal's context based on additional information received from the VMME and allocates a new GUTI which is communicated to the communications terminal in the NAS Command "Change state" message over the S1AP Initial Context Request message and RRC reconfiguration message. The NAS command is confirmed by the communications terminal in the NAS change state complete message which is carried in the RRC Reconfiguration Complete and the S1AP Initial Context Setup Complete message. The MME may also send a standalone NAS Command Change State message to the communications terminal encapsulated in the S1AP DL NAS transport message. The communications terminal responds with the standalone message as well. This is to enable the MME to trigger security procedures (the Authentication and security mode control procedures) and then the S1AP initial Context Setup procedure is used to re-establish all data radio bearers and the S1-U bearers for the communications terminal. From that moment the communications terminal can be considered as in the attached and connected states (in LTE it is the EMM_REGISTERED and ECM_CONNECTED states) at step S17.

Figure 7A:
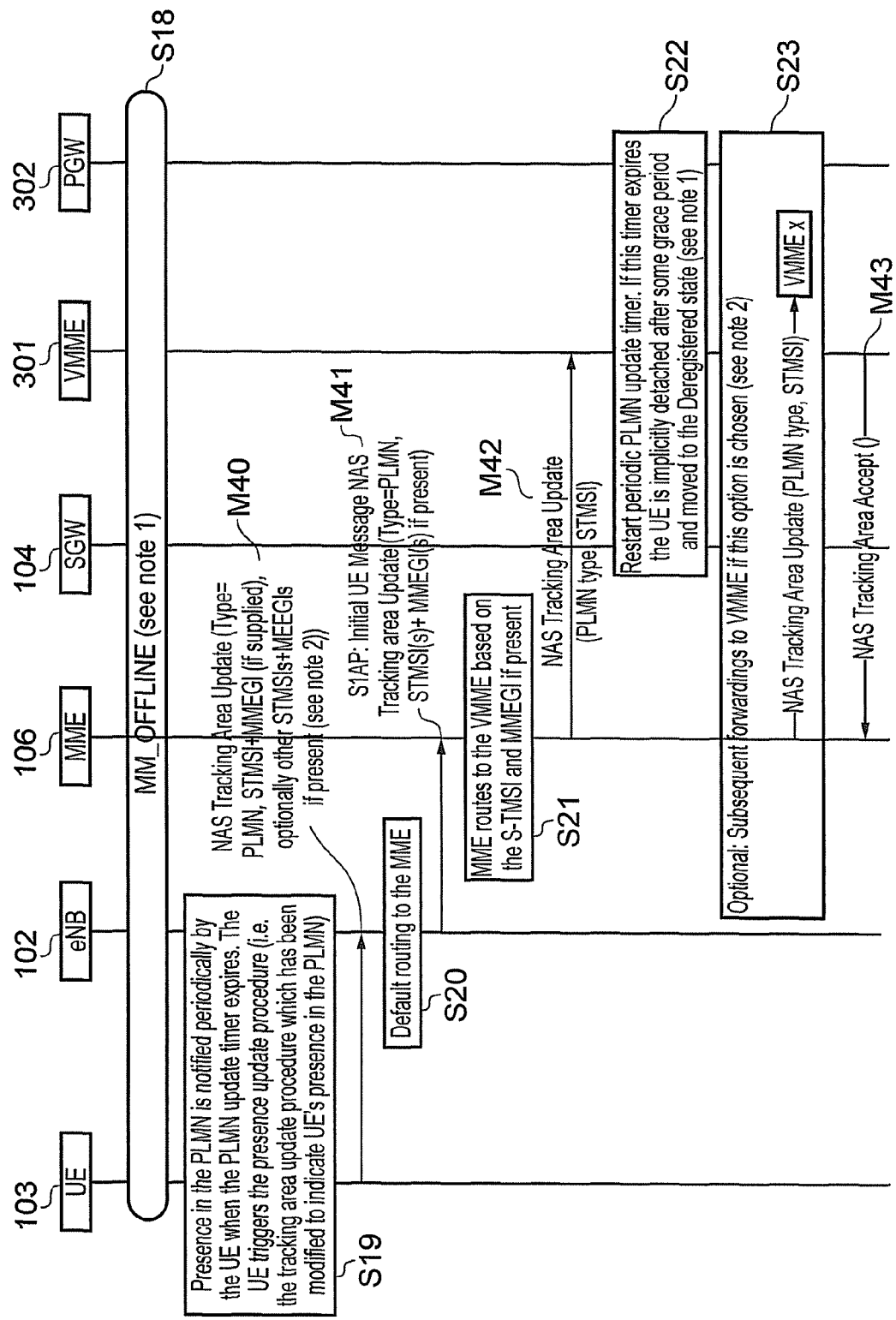
FIGS. 7a and 7b provides a call flow diagram illustrating an example embodiment of the present technique illustrating operations of a communications terminal and a mobile communications network when the communications terminal provides the communications network with an update of its presence when in an offline state.
Figure 7B:
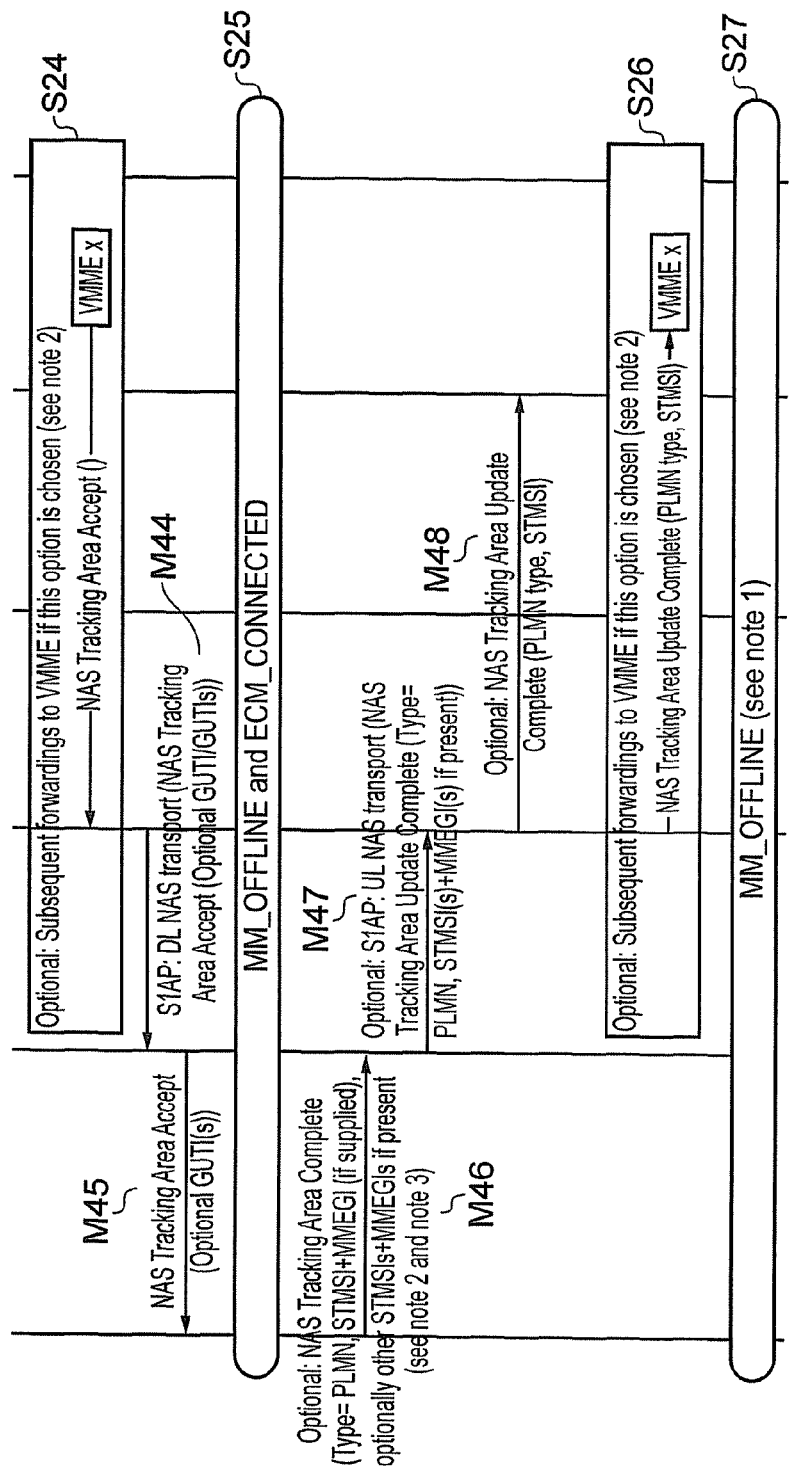

FIGS. 7a and 7b provides a call flow diagram illustrating an example embodiment of the present technique in which the communications terminal provides the communications network with an update of its presence and location when in an offline state.

Starting at step S18 with the communications terminal in the offline state, at step S19 the communications terminal 103 is arranged to periodically notify the mobile communications network of its presence after an update timer expires. Accordingly, the communications terminal triggers the presence update procedure which by implementation uses the tracking area update procedure which has been modified to indicate a communications terminals presence to the network which needs to be notified periodically. The communications terminal includes the S-TMSI(s) in an update message and MMEGI(s) if available. In addition the communications terminal 103 also provides its current location i.e. the tracking area. An eNode B receiving the message routes the message to the default MME 106. The default MME 106 based on the S-TMSI(s) and MMEGI(s) if available routes the request to the VMME(s) 301 which update(s) its PLMN periodic timer. The VMME 301 acknowledges the request to the communications terminal 103 in the tracking area accept message. The VMME(s) 301 may re-allocate GUTI(s) and pass them/it in this message. The communications terminal is required to acknowledge the receipt of the message only if a new GUTI/GUTIs has/have been allocated. This is realised in the tracking area update complete message.

Accordingly, as shown in FIG. 7a, a message M40 is sent from the communications terminal 103 to the eNode B 102 providing an NAS message which includes a tracking area update. The eNode B 102 uses a default routing of the NAS message M40 to the MME in step S20 to route a message M41 providing the tracking area update as a NAS message to the MME 106. In step S21 the MME routes to the VMME 301, based on the S-TMSI and MMEGI, if present the tracking area update message which is communicated to the VMME 301 via a message M42.

In step S22 the VMME 301 restarts a periodic communications network update timer. If this timer expires the communications terminal is implicitly detached after some grace period and moved to a de-registered state.

Optionally In step S23 further updates of the communication terminal's location is provided to the other VMMEs 301 as identified by S-TMSIs and MMEGIs which have been provided by the communication terminal 103 to the MME 106 in messages M40 and M41. The VMME 301 in each case provides a NAS message providing a tracking area accept message M43 to the MME 106. Alternatively the tracking update message is sent only to the VMME associated with the first PDN connection and PDN-GW and the VMME is required to update other VMME(s) if they exist.

Depending on arrangements in step 23 as shown in step S24 the VMME(s) may communicate the NAS tracking area accept message(s) to MME but this maybe

- just from one VMME 301 associated with the first PDN connection and PDN-GW established by the communication terminal 103 at the attached time which is used to provide the NAS tracking acceptance and the VMME correspondingly notifies all other parties. Using messages M44, M45, M46 and M47 the NAS tracking area accept message is transported in the S1AP Downlink transport and RRC message via the eNode B 102 to the communications terminal 103.
- From all VMME(s) associated with PDN connections and PDN-GW(s). In this case the MME 106 waits for all responses in order to be able to transmit new GUTI(s) to the communication terminal 103 if allocated in the NAS tracking area accept messages M44 and M45.

If new GUTI(s) has/have been allocated the NAS Tracking Area Complete message is transmitted by the communications terminal 103 in messages M46, M47 to the MME 106. Correspondingly (a) NAS tracking area update complete message(s) M48 is/are communicated to the VMME or VMMEs depending on the option employed in step 23 and in step 24. The communication terminal 103 and the network (the MME 106) shall be considered to be in the MM_Offline and connected state (S25)

In step S26 there is optionally the step of subsequent forwarding of the completion of the NAS tracking area updates to the VMME(s). At the end of the flow diagram step S27 indicates that the communications terminal is still in the offline state even though its presence and location has been updated to the mobile communications network.

It should be noted that the communications terminal 103 needs to include 5-TMSI(s) and MMEGI(s) if available in order to allow the MME 106 to route the response to the VMME(s). These identities are sent in the RRC message and S1-AP message because the NAS is encrypted and the MME as such cannot access ut/them and other IEs contained in the NAS message.

Figure 8:
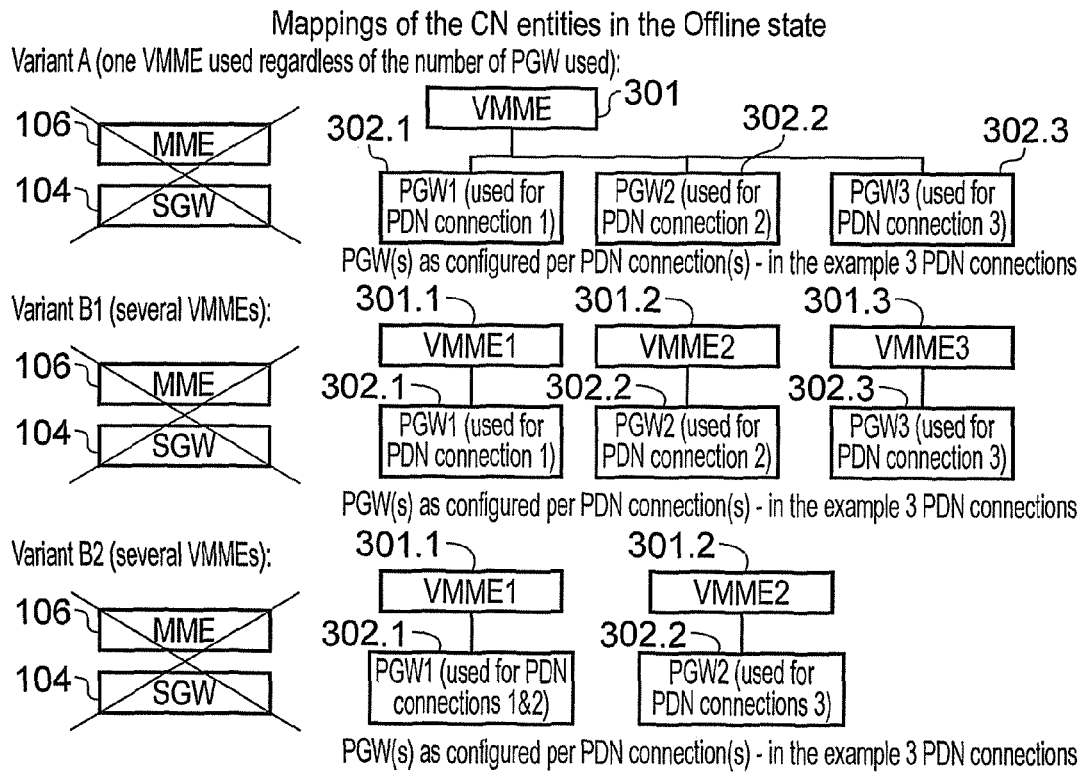
FIG. 8 provides a schematic illustration of example mapping of core network entities which are employed when a communications terminal enters an offline state.

FIG. 8 provides a schematic illustration of mappings of core network entities of a communications network corresponding to the example shown in FIG. 2, for an example in which the communications terminal enters the offline state. As shown in FIG. 8, there are three variants A, B1 and B2 which represent three possible architectures of the core network part of the mobile communications network of example entities which are serving the mobile communications terminal which has entered the offline state. In the variant A, the mobile communications terminal which has entered the offline state has, when in the attached state, available to it three PDN connections via three different PDN-GWs, which are identified as PGW1 302.1, PGW2 302.2 and PGW3 302.3. As explained above, when the mobile communications terminal enters the offline state part of the context information which is required to re-active the communications bearers, which have been used by the communications terminal are communicated from the MME 106 to the VMME 301. The context information stored may not correspond to the complete context information which was held at the MME 106 but a sub-set of this information. Furthermore the context information communicated to the VMME for storing in association with an identifier of the mobile communications terminal is sufficient to restore one or all of the communications bearers to any of the PDN connections PGW1 302.1, PGW2 302.2 and PGW3 302.3, when the mobile communications terminal moves from the offline state to the attached state. As such, if any of the PDN-GWs PGW1 302.1, PGW2 302.2 and PGW3 302.3 receives for example, U-plane data for communication to the mobile communications terminal in the offline state, then the PDN-GW PGW1 302.1, PGW2 302.2 and PGW3 302.3 which receives the U-plane data contacts the VMME 301 in order that the VMME can instigate communication with the mobile communications terminal to move the terminal to the attached state. Thus the first of the PDN-GWs to receive U-plane data for the communication terminal instigates contact with the VMME 301 in order to trigger the process of paging the mobile communications terminal in order to cause the mobile communications terminal to change from the offline state to the attached state.

The variants B1 and B2 also shown in FIG. 8 provide alternative examples. In variant B1, a VMME 301.1, 301.2, 301.3 is provided for each PDN-GW PGW1 302.1, PGW2 302.2, PGW3 302.3, so that in this example the PDN-GW which receives U-plane data for communicating to the mobile communications terminal via a PDN connection provided through the PDN-GW PGW1 302.1, PGW2 302.2, PGW3 302.3 will instigate communication with the mobile communications terminal by contacting its own VMME 301.1, 301.2, 301.3. Variant B2 presents a similar example, but does not provide a one to one correspondence between PDN connections and PDN-GWs PGW1 302.1, PGW2 302.2 and PGW3 302.3, because PDN-GW 302.1 serves two PDN connections 1 and 2, whereas the PDN-GW2 serves the PDN connection 3. However each of the two PDN-GWs PGW1 302.1, PGW2 302.2 has connected to it a VMME 301.1, 301.2 which is arranged to store the context information for the PDN connections of the mobile communications terminals. Thus if U-plane data is received for communication to the mobile communications terminal via either of the PDN connections 1 and 2, then the first PDN-GW contacts the first VMME 301.1, whereas if data is received via the PDN connection 3 at the second PDN-GW3, then the PDN-GW3 contacts the second VMME2 301.2.

Figure 9:
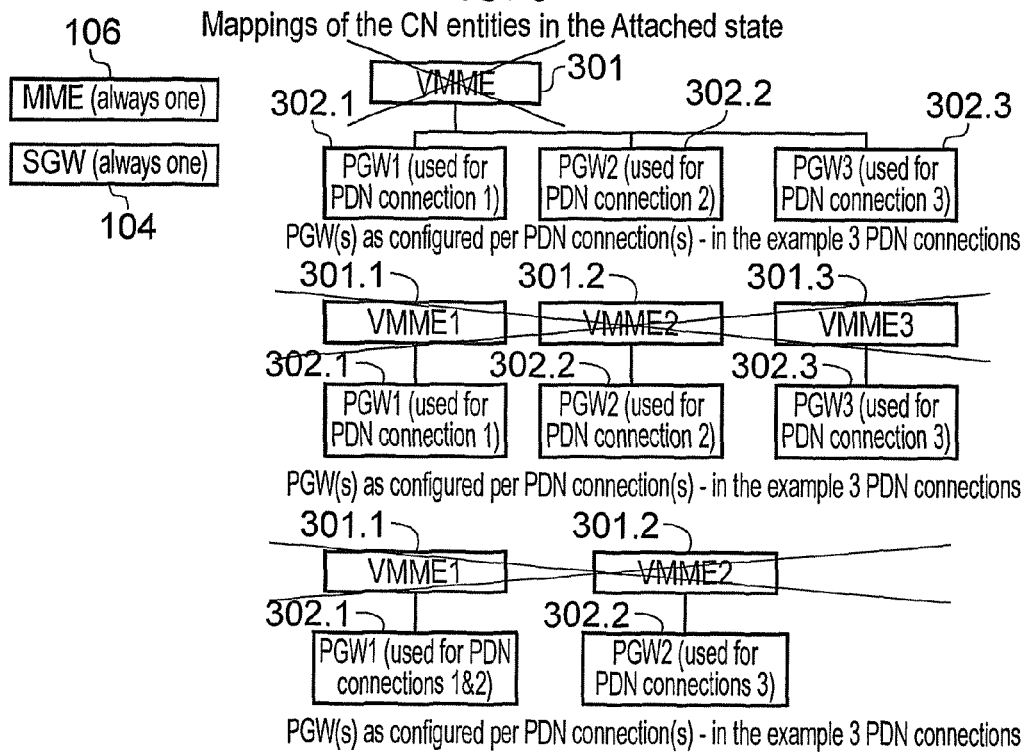
FIG. 9 provides a schematic illustration of the core network entities of FIG. 8 which show the example mapping of entities when the communications terminal enters an attached state.

FIG. 9 provides an illustration of the three example variants A, B1, B2 shown in FIG. 8, but showing the status of the entities when the mobile communications terminal has moved to the attached state. Thus as shown in FIG. 9, for each of the PDN connections 1, 2 and 3, whether provided by any of the three PDN-GW 302.1, 302.2, 302.3 and re-established by any of the VMMEs 301.1, 301.2, 301.3, there is only one MME 106 and one serving gateway S-GW 104, which is providing the PDN connections when the mobile communications terminal is in the attached state.

Other Examples

In accordance with the embodiments of the invention set out above, embodiments of the present invention can provide:

The mobility management (MM) in the 2G/3G or the EPS MM in the LTE/EPS has been extended and a new state has been introduced, which is the so called MM_Offline state.

The network has been arranged to restore the S5 interface (In 2/3G it is the Gn interface) without any further assistance or at least reduced assistance from the communications terminal. In normal circumstances the communications terminal needs to send the PDN connection request (in LTE) or the PDP context activation request in 2G/3G (also the network in 2G/3G may request the MS/communications terminal to activate the context by sending Request PDP context activation message)

The NAS context does not need to be manipulated at the communications terminal in order to establish (activate) bearers and come out from the "offline" state i.e. no session management procedures are required as it would have been if the communications terminal had been moved to the de-registered state.

The MM (or the EMM) communications terminal's context is pushed onto the VMME upon transition to the "offline" state Embodiments of the present technique find applications with mobile communications networks which communicate data using the UMTS/GSM standards. Furthermore embodiments also find application to the MSC for the circuit switched services i.e. calls with some adaptation on the GMSC instead of the PDN-GW and VMME.

Note that in the detached state the PDN connection does not exist at the PDN-GWN nor does at the GGSN. That means that there is no communications terminal's context at the PDN-GW nor at the GGSN. Due to the fact that there is no communications terminal's context at the PDN-GW/GGSN, these nodes cannot map the ingress IP flow onto the communications terminal (no TFT (traffic flow template) filters are configured). Also note that the PDN-GW may be used for the 2/3G system i.e. when the SGSNs are used which can handle the S4 interface.

Some example EMM context data which are stored at the MME is presented in the Appendix below. Only the subset of it would be stored at the Virtual MME.

Various modifications may be made to the embodiments herein before described. For example embodiments of the present invention have been described with reference to an implementation which uses a mobile radio network operating in accordance with the 3GPP Long Term Evolution (LTE) standard. However it will be understood that the principles of the present invention can be implemented using any suitable radio telecommunications technology and using any suitable network architecture in which shared communication bearers could be advantageously employed for example GSM, GPRS, W-CDMA (UMTS), CDMA2000, and other mobile communication standards.

According one example there is provided a communications terminal for transmitting data to and receiving data from a mobile communications network. The mobile communications network includes a radio network part having a plurality of base stations arranged to transmit data to and receive data from the communications terminal via a radio access interface, and a core network part which includes at least one packet data network gateway which is arranged to route data to and receive data from the base stations of the radio network part via the core network. A mobility manager is arranged to track a location of the communications terminal within the mobile communications network for routing the data to or receiving the data from the communications terminal via the radio network part in accordance with context information of the communications terminal, and the mobile communications network includes a virtual mobility manager. The communications terminal is configured to transmit an indication that the communications terminal is entering an offline state, the virtual mobility manager being configured, in response to the indication that the communications terminal has entered the offline state to store at least part of the context information of the communications terminal, upon a triggering event occurring, to receive a paging message from the virtual mobility manager at the offline communications terminal, and to establish with mobile communications network a communications bearer, for communicating the data after the communications terminal has moved to an attached state. An improvement can be provided when the communications terminal enters the offline state, because the location of each terminal is not tracked when changing designated tracking areas or a set of tracking areas and so paging can be co-ordinated by a higher level virtual mobility manager rather than a lower level mobility manager.

The invention claimed is:

1. A mobile communications system, comprising:
one or more communications terminals; and
a mobile communications network, the mobile communications network includes a radio network part, a core network part, and a virtual mobility manager, the radio network part having a plurality of base stations arranged to transmit data to and receive data from the one or more communications terminals via a radio access interface, and the core network part having at least one packet data network gateway arranged to route data to and receive data from the base stations of the radio network part and a mobility manager arranged to track a location of the one or more communications terminals within the mobile communications network for routing data to or receiving data from the one or more communications terminals via the radio network part in accordance with context information which is stored for each of the one or more communications terminals, wherein
the virtual mobility manager is configured to receive an indication from a communications terminal that the communications terminal is entering an offline state, the communications terminal being from among the one or more communications terminals,
the mobility manager is configured to transmit, to the virtual mobility manager when the communications terminal has entered the offline state, the context information of the communications terminal with a first unique identifier associated with the communication terminal, and
the virtual mobility manager is further configured to
generate a second unique identifier and communicate the second unique identifier to the communications terminal, and
store at least part of the context information of the communications terminal with the second unique identifier when the communications terminal enters the offline state so that when a triggering event occurs when the communications terminal is in the offline state, the virtual mobility manager pages the communications terminal in the offline state so that a communications bearer establishes with the communications terminal using the stored context information, for communicating data after the communications terminal has moved to an attached state.

2. The mobile communications system as claimed in claim 1, wherein when the communications terminal is in the offline state, the communications terminal reduces an amount of data communicated to or received from the mobile communications network.

3. The mobile communications system as claimed in claim 1, wherein the mobility manager is configured to detect when the communications terminal has entered the offline state.

4. The mobile communications system as claimed in claim 3, wherein the virtual mobility manager is configured to store the at least part of the context information in association with the first unique identifier.

5. The mobile communications system as claimed in claim 4, wherein the first unique identifier and the second unique identifier are global unique temporary identifiers (GUTI).

6. The mobile communications system as claimed in claim 4, wherein the virtual mobility manager is configured to derive the second unique identifier based on the first unique identifier.

7. The mobile communications system as claimed in claim 1, wherein the virtual mobility manager is configured, following the triggering event, to cause the radio network part to page the communications terminal by transmitting a paging message to the communications terminal, which includes an identity of the communications terminal.

8. The mobile communications system as claimed in claim 7, wherein the triggering event includes the packet data network gateway receiving data for communicating to the communications terminal.

9. The mobile communications system as claimed in claim 7, wherein the triggering event includes the mobile communications network receiving control plane data for communicating to the communications terminal.

10. The mobile communications system as claimed in claim 7, wherein the triggering event includes the communications terminal moving from the offline state to the attached state in response to a user command.

11. The mobile communications system as claimed in claim 7, wherein the triggering event includes the communications terminal moving from the offline state to the attached state in order to communicate data to the mobile communications network.

12. A mobile communications network for transmitting data to and receiving data from one or more communications terminals, the mobile communications network comprising:
 a radio network part including a plurality of base stations arranged to transmit data to and receive data from the one or more communications terminals via a radio access interface;
 a core network part including
  at least one packet data network gateway arranged to route data to and receive data from the base stations of the radio network part, and
  a mobility manager arranged to track a location of the one or more communications terminals within the mobile communications network for routing data to or receiving data from the one or more communications terminals via the radio network part in accordance with context information which is stored for each of the one or more communications terminals; and
 a virtual mobility manager configured to receive an indication from a communications terminal that the communications terminal is entering an offline state, the communications terminal being from among the one or more communications terminals, wherein
 the mobility manager is configured to transmit, to the virtual mobility manager when the communications terminal has entered the offline state, the context information of the communications terminal with a first unique identifier associated with the communication terminal, and
 the virtual mobility manager is further configured to
  generate a second unique identifier and communicate the second unique identifier to the communications terminal, and
  store at least part of the context information of the communications terminal with the second unique identifier when the communications terminal enters the offline state so that when a triggering event occurs when the communications terminal is in the offline state, the virtual mobility manager pages the communications terminal in the offline state so that a communications bearer establishes with the communications terminal using the stored context information, for communicating data after the communications terminal has moved to an attached state.

13. The mobile communications network as claimed in claim 12, wherein the offline state corresponds to a state in which the communications terminal reduces an amount of data communicated to or received from the mobile communications network.

14. The mobile communications network as claimed in claim 12, wherein the mobility manager is configured to detect when the communications terminal has entered the offline state.

15. The mobile communications network as claimed in claim 14, wherein the virtual mobility manager is configured to store the at least part of the context information in association with the first unique identifier.

16. The mobile communications network as claimed in claim 15, wherein the first unique identifier and the second unique identifier are global unique temporary identifiers (GUTI).

17. The mobile communications network as claimed in claim 15, wherein the virtual mobility manager is configured to derive the second unique identifier based on the first unique identifier.

18. The mobile communications network as claimed in claim 12, wherein the virtual mobility manager is configured, following the triggering event, to cause the radio network part to page the communications terminal by transmitting a paging message to the communications terminal, which includes an identity of the communications terminal.

19. The mobile communications network as claimed in claim 12, wherein the triggering event includes the packet data network gateway receiving data for communicating to the communications terminal.

20. The mobile communications network as claimed in claim 12, wherein the triggering event includes the mobile communications network receiving control plane data for communicating to the communications terminal.

21. The mobile communications network as claimed in claim 12, wherein the triggering event includes the communications terminal moving from the offline state to the attached state in response to a user command.

22. The mobile communications network as claimed in claim 12, wherein the triggering event includes the communications terminal moving from the offline state to the attached state in order to communicate data to the mobile communications network.

23. An infrastructure equipment, comprising:
 circuitry configured to form part of a mobile communications network which communicates data to or from one or more communications terminals, the mobile communications network comprising a radio network part, a core network part, and a virtual mobility manager, the radio network part having a plurality of base stations arranged to transmit data to and receive data from the one or more communications terminals via a radio access interface, and the core network part including at least one packet data network gateway arranged to route data to and receive data from the base stations of the radio network part and a mobility manager arranged to track a location of the one or more communications terminals within the mobile communications network for routing data to or receiving data from the one or more communications terminals via the radio network part in accordance with context information which is stored for each of the one or more communications terminals, wherein
 the virtual mobility manager is configured to receive an indication from a communications terminal that the communications terminal is entering an offline state, the communications terminal being from among the one or more communications terminals,
 the mobility manager is configured to transmit, to the virtual mobility manager when the communications terminal has entered the offline state, the context information of the communications terminal with a first unique identifier associated with the communication terminal, and
 the virtual mobility manager is further configured to
  generate a second unique identifier and communicate the second unique identifier to the communications terminal, and
  store at least part of the context information of the communications terminal with the second unique identifier when the communications terminal enters the offline state so that when a triggering event occurs when the communications terminal is in the offline state, the virtual mobility manager pages the communications terminal in the offline state so that a communications bearer establishes with the communications terminal using the stored context information, for communicating data after the communications terminal has moved to an attached state.

24. A system comprising a mobile communications network which communicates data to or from one or more communications terminals, the mobile communications network including a radio network part and a core network part, the radio network part having a plurality of base stations arranged to transmit data to and receive data from the one or more communications terminals via a radio access interface, and the core network part having at least one packet data network gateway arranged to route data to and receive data from the base stations of the radio network part and a mobility manager, the mobility manager being configured to track a location of the one or more communications terminals within the mobile communications network for routing data to or receiving data from the one or more communications terminals via the radio network part in accordance with context information which is stored for each of the one or more communications terminals, wherein the mobile communications network includes a virtual mobility manager configured to receive an indication from a communications terminal that the communications terminal is entering an offline state, the communications terminal being from among the one or more communications terminals, the mobility manager is configured to detect when the communications terminal has entered the offline state, and transmit, to the virtual mobility manager when the communications terminal has entered the offline state, the context information of the communications terminal with a first unique identifier associated with the communication terminal, and the virtual mobility manager is further configured to generate a second unique identifier and communicate the second unique identifier to the communications terminal, and store at least part of the context information of the communications terminal with the second unique identifier when the communications terminal enters the offline state so that when a triggering event occurs when the communications terminal is in the offline state, the virtual mobility manager pages the communications terminal in the offline state so that a communications bearer establishes with the communications terminal using the stored context information, for communicating data after the communications terminal has moved to an attached state.

25. A method of transmitting data to and receiving data from a mobile communications network, the mobile communications network including a radio network part, a core network part, and a virtual mobility manager, the radio network part having a plurality of base stations arranged to transmit data to and receive data from one or more communications terminals via a radio access interface, and the core network part having at least one packet data network gateway arranged to route data to and receive data from the base stations of the radio network part and a mobility manager arranged to track a location of the one or more communications terminals within the mobile communications network for routing data to or receiving data from the one or more communications terminals via the radio network part in accordance with context information which is stored for each of the one or more communications terminals, the method comprising:

receiving, by the virtual mobility manager, an indication from a communications terminal that the communications terminal is entering an offline state, the communications terminal being from among the one or more communications terminals;

transmitting, by the mobility manager to the virtual mobility manager when the communications terminal has entered the offline state, the context information of the communications terminal with a first unique identifier associated with the communication terminal;

generating, by the virtual mobility manager, a second unique identifier and communicating the second unique identifier to the communications terminal; and storing, by the virtual mobility manager, at least part of the context information of the communications terminal with the second unique identifier when the communications terminal enters the offline state so that when a triggering event occurs when the communications terminal is in the offline state, the virtual mobility manager pages the communications terminal in the offline state so that a communications bearer establishes with the communications terminal using the stored context information, for communicating data after the communications terminal has moved to an attached state.

26. The method as claimed in claim 25, wherein the offline state corresponds to a state in which the communications terminal reduces an amount of data communicated to or received from the mobile communications network.

27. The method as claimed in claim 25, further comprising:

detecting when the communications terminal has entered the offline state.

28. The method as claimed in claim 27, wherein the storing includes storing the at least part of the context information in association with the first unique identifier.

29. The method as claimed in claim 28, wherein the first unique identifier and the second unique identifier are global unique temporary identifiers (GUTI).

30. The method as claimed in claim 28, wherein the generating of the second unique identifier includes deriving the second unique identifier based on the first unique identifier.

31. The method as claimed in claim 25, further comprising:

following the triggering event, causing the radio network part to page the communications terminal by transmitting a paging message to the communications terminal, which includes an identity of the communications terminal.

32. The method as claimed in claim 31, wherein the triggering event includes the packet data network gateway receiving data for communicating to the communications terminal.

33. The method as claimed in claim 31, wherein the triggering event includes the mobile communications network receiving control plane data for communicating to the communications terminal.

34. The method as claimed in claim 31, wherein the triggering event includes the communications terminal moving from the state to the attached state in response to a user command.

35. The method as claimed in claim 31, wherein the triggering event includes the communications terminal moving from the offline state to the attached state in order to communicate data to the mobile communications network.

* * * * *